(12) United States Patent
Rhoads

(10) Patent No.: US 9,426,451 B2
(45) Date of Patent: Aug. 23, 2016

(54) COOPERATIVE PHOTOGRAPHY

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 82 days.

(21) Appl. No.: 14/216,481

(22) Filed: Mar. 17, 2014

(65) Prior Publication Data

US 2014/0286566 A1    Sep. 25, 2014

Related U.S. Application Data

(60) Provisional application No. 61/800,171, filed on Mar. 15, 2013.

(51) Int. Cl.
G06K 9/00      (2006.01)
H04N 13/02     (2006.01)
H04N 13/00     (2006.01)
G06T 15/40     (2011.01)
G06T 3/40      (2006.01)
G06T 5/00      (2006.01)
G06T 7/00      (2006.01)
G06T 15/04     (2011.01)
G06T 17/00     (2006.01)

(52) U.S. Cl.
CPC .......... H04N 13/0275 (2013.01); G06T 3/4038 (2013.01); G06T 5/001 (2013.01); G06T 7/0075 (2013.01); G06T 15/04 (2013.01); G06T 15/40 (2013.01); G06T 17/00 (2013.01); H04N 13/0011 (2013.01); H04N 13/0271 (2013.01); G06T 2207/10021 (2013.01); G06T 2207/20221 (2013.01)

(58) Field of Classification Search
None
See application file for complete search history.

(56) References Cited

U.S. PATENT DOCUMENTS 5,850,352 A * 12/1998 Moezzi .................. H04N 5/222
                                                345/419
6,269,175 B1 * 7/2001 Hanna ....................... G06T 5/50
                                              348/E13.014
6,714,672 B1 * 3/2004 Berestov ............ G06K 9/00604
                                                351/206

(Continued)

FOREIGN PATENT DOCUMENTS

WO    WO 2014145722    9/2014

OTHER PUBLICATIONS

International Search Report and Written Opinion dated Oct. 21, 2014, in PCT/US14/30531 (corresponding to WO2014145722).

(Continued)

Primary Examiner — Aaron W Carter
(74) Attorney, Agent, or Firm — Digimarc Corporation

(57) ABSTRACT

Imagery from two or more users' different smartphones is streamed to a cloud processor, enabling creation of 3D model information about a scene being imaged. From this model, arbitrary views and streams can be synthesized. In one arrangement, a user of such a system is at a sports arena, and her view of the sporting event is blocked when another spectator rises to his feet in front of her. Nonetheless, the imagery presented on her headworn display continues uninterrupted—the blocked imagery from that viewpoint being seamlessly re-created based on imagery contributed by other system users in the arena. A great variety of other features and arrangements are also detailed.

11 Claims, 20 Drawing Sheets

(56) References Cited

U.S. PATENT DOCUMENTS

| | | | |
|---|---|---|---|
| 6,865,289 B1 | 3/2005 | Berestov | |
| 8,160,400 B2 | 4/2012 | Snavely et al. | |
| 9,197,822 B1* | 11/2015 | Kobold | H04N 5/2621 |
| 2004/0105580 A1* | 6/2004 | Hager | G06T 7/0077 |
| | | | 382/154 |
| 2004/0264806 A1* | 12/2004 | Herley | G06T 5/50 |
| | | | 382/284 |
| 2007/0086646 A1 | 4/2007 | Yang et al. | |
| 2007/0110338 A1* | 5/2007 | Snavely | G06F 17/30274 |
| | | | 382/305 |
| 2007/0136408 A1 | 6/2007 | Wheeler et al. | |
| 2009/0092282 A1* | 4/2009 | Avidan | G06T 7/2046 |
| | | | 382/103 |
| 2009/0110239 A1 | 4/2009 | Chen et al. | |
| 2010/0026712 A1* | 2/2010 | Aliprandi | H04N 13/0011 |
| | | | 345/629 |
| 2010/0238164 A1 | 9/2010 | Steedly et al. | |
| 2010/0245535 A1* | 9/2010 | Mauchly | G06T 7/0075 |
| | | | 348/14.08 |
| 2011/0148858 A1* | 6/2011 | Ni | H04N 13/0011 |
| | | | 345/419 |
| 2011/0199379 A1 | 8/2011 | Benien et al. | |
| 2011/0242286 A1 | 10/2011 | Pace et al. | |
| 2012/0106785 A1* | 5/2012 | Karafin | G06T 11/00 |
| | | | 382/103 |
| 2012/0147205 A1* | 6/2012 | Lelescu | H04N 13/0029 |
| | | | 348/218.1 |
| 2012/0188341 A1* | 7/2012 | Klein Gunnewiek | H04N 13/0048 |
| | | | 348/43 |
| 2012/0196320 A1* | 8/2012 | Seibel | G01N 1/30 |
| | | | 435/40.52 |
| 2012/0219188 A1 | 8/2012 | Kurz et al. | |
| 2013/0156264 A1* | 6/2013 | Martensson | G06T 7/0075 |
| | | | 382/103 |
| 2013/0315473 A1* | 11/2013 | Takahashi | G06T 15/205 |
| | | | 382/154 |
| 2014/0176591 A1 | 6/2014 | Klein et al. | |
| 2014/0192148 A1* | 7/2014 | Georgakis | H04N 13/0011 |
| | | | 348/42 |
| 2014/0267546 A1* | 9/2014 | Kwon | H04N 7/142 |
| | | | 348/14.02 |
| 2014/0267917 A1* | 9/2014 | Backer | H04N 5/265 |
| | | | 345/598 |
| 2014/0269930 A1* | 9/2014 | Robinson | H04N 21/2365 |
| | | | 375/240.24 |
| 2014/0286566 A1* | 9/2014 | Rhoads | H04N 13/0275 |
| | | | 382/154 |
| 2014/0288413 A1* | 9/2014 | Hwang | 600/424 |
| 2015/0019657 A1* | 1/2015 | Sakai | H04L 12/1831 |
| | | | 709/206 |
| 2015/0054913 A1* | 2/2015 | Annau | G11B 27/11 |
| | | | 348/36 |
| 2015/0084991 A1* | 3/2015 | Schutz | G06T 5/50 |
| | | | 345/647 |
| 2015/0172633 A1* | 6/2015 | Nobori | H04N 5/23238 |
| | | | 348/36 |
| 2015/0229913 A1* | 8/2015 | Bei | G06T 7/0075 |
| | | | 348/46 |
| 2015/0310274 A1* | 10/2015 | Shreve | G06K 9/00624 |
| | | | 382/103 |
| 2016/0028968 A1* | 1/2016 | Affaticati | H04N 5/2723 |
| | | | 348/47 |

OTHER PUBLICATIONS

El-Hakim, et al, Semi-Automatic 3D Reconstruction of Occluded and Unmarked Surfaces from Widely Separated Views, Close Range Visualization Techniques (2002).

Agarwal, et al, Building Rome in a Day, Communications of the ACM 54.10 (2011), pp. 105-112.

* cited by examiner

COOPERATIVE PHOTOGRAPHY

RELATED APPLICATION DATA

This application claims priority to provisional application 61/800,171, filed Mar. 15, 2013.

TECHNICAL FIELD

The present technology concerns photographic imaging, and in one exemplary embodiment concerns collaborative use of scene information from different sensors to yield enhanced image products.

INTRODUCTION

Computer techniques are extending the boundaries of what is possible with photography. Examples include arrangements in which information from several image frames are composited together to yield enhanced imagery.

High dynamic range imaging is one such technique. Plural frames of a scene are captured, at different exposures. The results are combined to yield a single image in which scene features in both shadows and highlights are visible.

Another seeks to depict a group of people at an instant when none of them is blinking (or when all of them are smiling). Again, several image frames are captured, in a short burst. From the set, a satisfactory depiction of each face is identified (i.e., when that person is not blinking, or when that person is smiling). Excerpts depicting these faces are composited together in a single image, showing all the faces—with none of them blinking (or all of them smiling).

More complex synthetic image techniques are also known, such as Microsoft's Photosynth technology.

Photosynth, developed by Steven Seitz, Noah Snavely and others, processes multiple photos of a place (e.g., Rome), contributed by different users at different times, to yield viewpoint-explorable fusion imagery. Details of such technology are provided in U.S. Pat. No. 8,160,400, and in articles identified below. The artisan is presumed to be familiar with such work.

In accordance with one aspect of the present technology, cooperative imaging is expanded and applied to produce social image products—synthetic imagery (still and video, photorealistic and not) based on imagery captured by multiple camera-equipped systems (e.g., smartphones), typically at gatherings of people, e.g., family reunions, graduations, proms, sporting events, etc.

An exemplary application is a mother at a championship high school basketball game who is wearing a headworn camera apparatus that she activated to capture video of the final moments of the game. Her son is racing down court to make the winning shot. Suddenly, her view is blocked when a dad in front jumps to his feet to cheer on the team—causing her video to miss the crucial instants.

Fortunately, an app on her smartphone is feeding the video to a cloud service, where it is combined with videos from others in the gymnasium. The service creates a model of the event in nearly real-time. Based on these contributions from others at the game, the service can provide to the mother a rendered video synthesized from the crowd-sourced model—showing the view from her seat in the bleachers—without blockage by the dad in front.

In some embodiments, the camera systems used in such systems provide not just imagery, but also depth information to aid in accurate definition of the model. Time of flight cameras, stereoscopic ranging cameras, plenoptic cameras, and other emerging technologies (e.g., as detailed in patent application Ser. No. 13/842,282, filed Mar. 15, 2013) can be used for this purpose.

Anticipating the day when users with headworn cameras pump terabytes of such live video imagery to the cloud, other parts of the present technology concern data representation and storage. Much such video will be redundant. In the example just-given, for example, all cameras are viewing the same scene, so the information content of one video stream will be largely duplicative of that of other video streams. In accordance with a further aspect of the technology, the original video streams are discarded and not retained. Instead, a model produced from the video streams, alone, is stored—memorializing the information without the redundancy of the component videos.

Similarly, the model can comprise plural virtual structures (e.g., 2- or 3-D meshes) representing shapes of objects in the scene, draped with pixel imagery. Some of these structures (e.g., the floor of the basketball court, the baskets themselves) are typically static. These can be represented by a single fixed set of data that does not vary during the temporal extent of the model.

Some smaller movements in such a model, e.g., a person blinking in a family portrait, can be reflected by a change in the draped imagery, without changing the virtual structure shape on which the pixels are draped.

Still further economy in data storage can be achieved by dividing a component virtual structure into two parts, when part of the original structure moves. If parents are filming a group of high school couples dressed for a prom, and one young man puts his arm around his date, a new virtual structure may be spawned from the structure formerly representing the young man, to separately represent the arm—allowing its movement to be represented in the model while permitting the rest of his corresponding virtual structure to remain unchanged.

Still other aspects of the technology concern temporal synchronization of the different incoming video feeds (which may be at slightly or wildly different frame rates), so that their contributions to the model can be coordinated correctly.

The foregoing and many other features and advantages of the present technology will be more readily apparent from the following detailed description, which proceeds with reference to the accompanying drawings.

DETAILED DESCRIPTION

Figure 1:
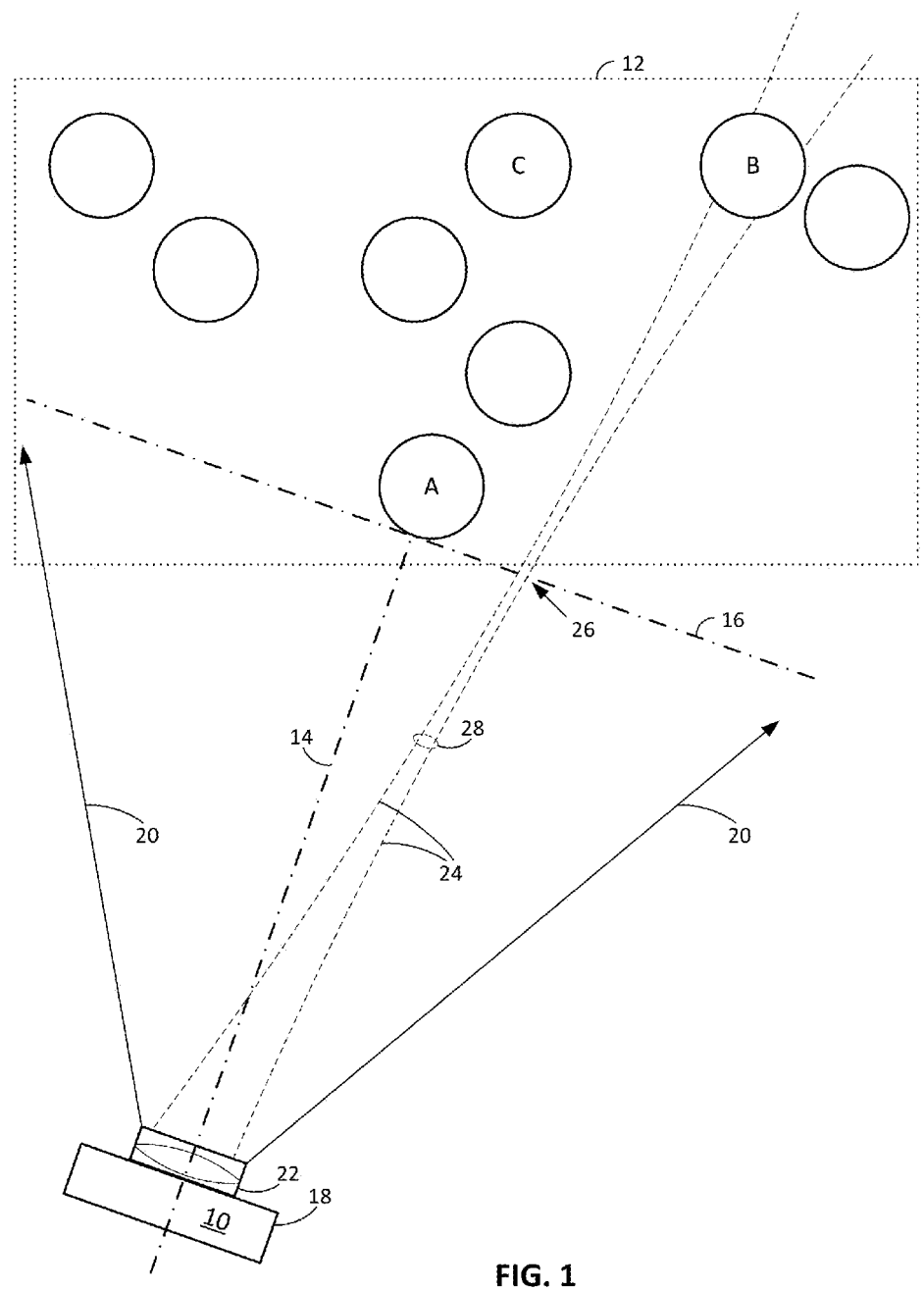
FIG. 1 is a schematic view showing a camera capturing an image of a group of people.

This specification spans a great deal of technology. An ordered presentation is difficult to achieve, as each discussion tends to draw not only from what came before, but also what comes later. The reader is asked to forgive the "random walk" progression that naturally ensues. With that said, we dive in with something of an overview:

In one aspect, the technology involves a cloud-based processor system that receives a first stream of scene-related data including video imagery captured by a first camera-equipped system (e.g., a smartphone, optionally with a headworn camera component). This first stream depicts a group of one or more persons from a first viewpoint location. Desirably, this first stream is accompanied by time-based information, such as GPS-synchronized time codes.

The cloud-based processor system similarly receives a second stream of scene-related data, captured by a second camera-equipped system, depicting the same group, but from a second, different, viewpoint location. Still further such streams can also be employed.

The cloud-based system processes these streams of data to produce one or more image products. One such image product is a video of the group as it would be viewed from a new viewpoint—one that is different than that of any of the contributing data streams. The cloud-based system can then provide this image product to one of the contributing camera systems, or to another recipient that contributed none of the component information.

Desirably, this processing occurs in nearly real-time, so that the resulting image product can be sent by the cloud-based system back to the first system, while the first system is still providing the first stream of data to the cloud processor. (A one second or so latency is typically incurred due to the processing and the data transmission delays.) Google Glass or similar headworn display allows the user to look directly at the real world scene, while also being provided a synthetic view of the scene on the display. This synthetic view—while delayed slightly from the real world—can provide a perspective or attribute (e.g., occlusion removal) not physically available to the user (e.g., a vantage point as if hovering above the scene).

As noted, the cloud-based processor generates a model of the scene, comprising one or more virtual structures (e.g., meshes) that are painted (draped) with pixel imagery. (Such model creation is within the skills of the artisan guided, e.g., by the Seitz/Snavely writings cited below.) In creating this model, the processor can infer the viewpoints of the contributing camera systems using techniques known from the cited works. Alternatively, one or more of the contributing camera systems can provide location data that define their respective viewpoints, e.g., by reference to GPS data, and/or by reference to pose information from smartphone gyroscopic sensors, magnetometer sensors, etc. (Instead of using GPS, location can also be determined by systems such as described in U.S. Pat. Nos. 7,876,266 and 7,983,185, and published US Patent Application 20090213828.) The position of a camera system can be defined either in absolute terms, or relative to some local reference—such as relative to another contributing camera system. One particular implementation relies on the familiar latitude/longitude framework, with an orientation plane (i.e., the flat local earth), an origin (e.g., an arbitrary lat/long in the local area), and an ordinal direction (north). Camera locations, pixel disks, synthetic viewpoints, etc., can all be defined in such a coordinate system. (This, and many alternative approaches, are well understood from, e.g., video graphics gaming technologies.)

In one particular implementation, the meshes are planar structures, or slightly non-planar, e.g., for rounded head fronts and rounded body fronts. (3D meshes can alternatively be used, with an attendant increase in complexity and processing burden.) These structures are virtually placed in the model, e.g., to occupy the planes of one or more of the bodies depicted in the imagery.

Figure 16A:
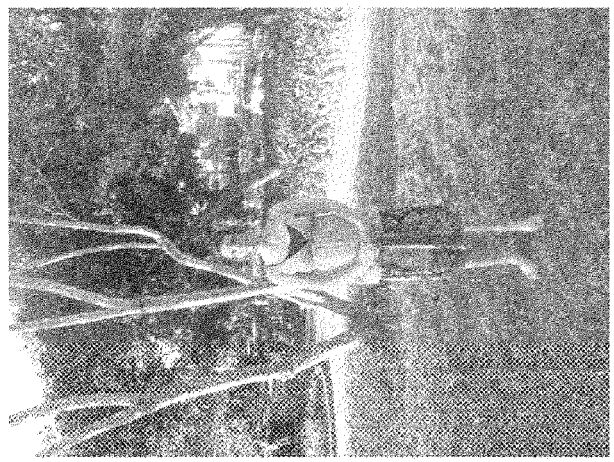
FIGS. 16A, 16B and 16C show three images of a person taken from video captured by three users at three viewpoints.
Figure 16B:
Figure 16C:
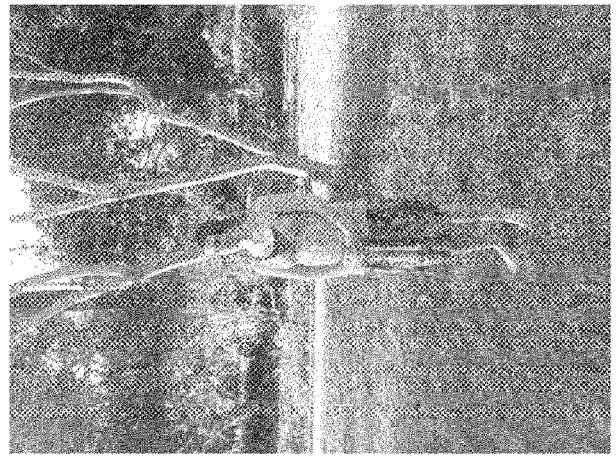

Consider FIGS. 16A-16C. These are three images of a person taken from video captured by three users at three viewpoints. The cloud-based processor analyzing such data may decide that four meshes will suffice to represent this scene: (a) one for a rough outline around the person; (b) one for the tree (the parallax from the different images indicates it is in a different image plane than the person and the background); (c) one for the ground; and (d) one for everything else (background and sky).

Figure 17B:
FIGS. 17A and 17B are time-spaced frames from a single video feed, showing that a subject has moved her leg.
Figure 17A:

FIGS. 17A and 17B are time-spaced frames from a single video feed, showing that the person has moved a leg. The movement is of a character that the cloud service may decide can be represented with the original four meshes, simply by updating the mesh corresponding to the person (and updating the draped pixels). Alternatively, the service may decide the movement is best handled by spawning a new mesh—for the leg, so that its movement in the model can be reflected while keeping the mesh corresponding to the rest of the body static.

In rendering synthetic output from the resultant model, the cloud-based service may update the meshes at 4 Hz, and may update the draped pixels at 10 Hz.

Temporal coordination of the incoming data can be as simple, or elaborate, as desired. On the simple end, a first image stream can be used as a reference, and two or more image frames in a second image stream can be temporally weighted and combined as needed to generate interpolated (blended) image frames corresponding to those instants in time at which frames in the first stream were captured.

Figure 18:
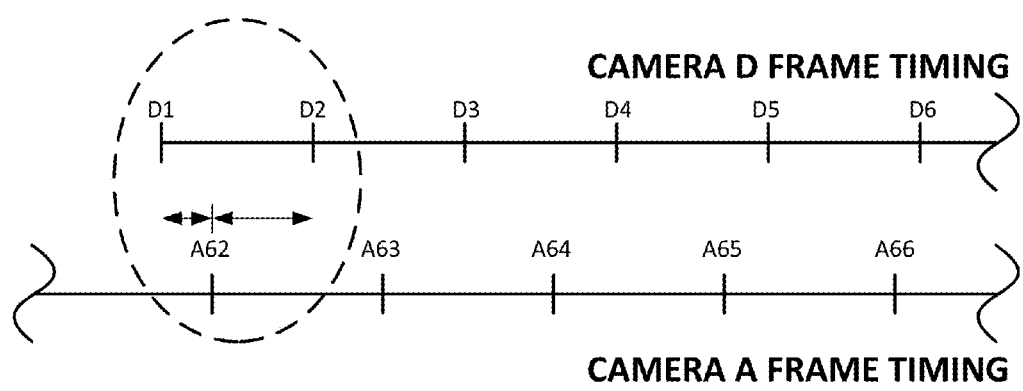
FIG. 18 is a diagram showing relative timings of frame captures by different cameras.

One such arrangement is shown in FIG. 18. Camera D captures frames at instants D1, D2, etc. Meanwhile, Camera A has been previously capturing frames, and has captured dozens of frames by the time camera D starts.

The capture instants of Camera A may be used as a reference. ("Instants" is something of a misnomer given the reality of exposure intervals, but is a convenient approximation.) Thus, imagery from the Camera D frame sequence is processed to produce synthetic frames corresponding to the capture instants of Camera A. To produce a synthetic frame in the camera D sequence corresponding to frame A62 in the Camera A sequence, frames D1 and D2 may be used. In a simple embodiment, the two frames are linearly weighted and interpolated in accordance with their temporal distance from the frame A62 instant (indicated by the arrows). In similar fashion, synthetic frames are produced from the D camera data corresponding to frames A63, A64, etc.

In other such embodiments polynomial or other interpolation techniques can be used.

On the more elaborate end, the temporal coordination algorithms can take into account nuances such as rolling shutters, drift in each camera's frame capture rate, etc.

In most embodiments the image streams fed to the cloud processor include time stamps by which the capture times of the component frames can be established. (Most smartphones and similar devices have access to highly accurate timing data, e.g., used by the telecom networks for their transmission protocols.) In other embodiments, temporal synchrony between different image feeds can be discerned by shared features in the data streams, e.g., the instant when a person blinked, etc.

The image products produced by the cloud service needn't be photo-realistic. Indeed, many applications of the technology deliberately seek to provide more abstract renderings of a scene—introducing elements of cubism, false coloring, etc.—some akin to effects popularized by Instagram, others more radical.

The cloud-based processor can associate together related data feeds in various ways. A simple technique is by geolocation information. A cluster of streams originating from a common location (e.g., within 30 feet, or 30 yards, or 300 feet or 300 yards) can be assumed to relate to a common scene. Outliers can be identified by analysis of the imagery, and removed from the group. In other arrangements, the identification of common streams can be explicit, such as by a coordinating identifier accompanying the data streamed by each camera system viewing a particular scene. In still other arrangements, a common event to which streamed data relates can be identified by context information (e.g., calendar data stored in smartphones of participants), and grouped on that basis.

In a particular embodiment, the cloud-based processor has two principle roles, which may be served by different processing components—both having access to a common data repository. One role is the coordination of the incoming data streams, and generation of a corresponding model. The second role is rendering requested image products, and delivering them to requesting users. (Each user may specify a desired viewpoint location, a desired type of image product such as video or still imagery, particular options concerning the rendering—such as photorealistic or otherwise, occlusion-free, etc.)

Some embodiments start with Bundler—open source software written by Noah Snavely that takes image data as input, and outputs a 3D reconstruction of the scene geometry. Related is PMVS2 software by Yasutaka Furukawa. Output data from such software can be provided to code based on PixelStruct—an open source tool for visualizing 3D scenes reconstructed from imagery.

Some embodiments employ OpenGL, WebGL or OpenCV to perform image processing and/or rendering operations.

It will be recognized that point cloud techniques, as detailed in the Photosynth work, can also be used in representing the scene.

A Deeper Dive into Geometry

FIG. 1 is a schematic view looking down on a first camera 10 used to photograph a group of people 12. The people are indicated by circles; three people "A," "B" and "C" are particularly identified.

The camera is pointed along an axis 14, and is focused on the face of person A. The camera thus defines an object plane 16 that passes through the face of person A, and is parallel to the image sensor (not shown) inside the body 18 of the camera. The camera has a field of view that spans the group of people, as indicated by arrows 20.

Theoretically, rays passing from the image sensor, through the lens 22, converge (and cross) at a single point on the object plane. That is, there is ideally a one-to-one correspondence between points on the image sensor, and points on the object plane.

Figure 14A:
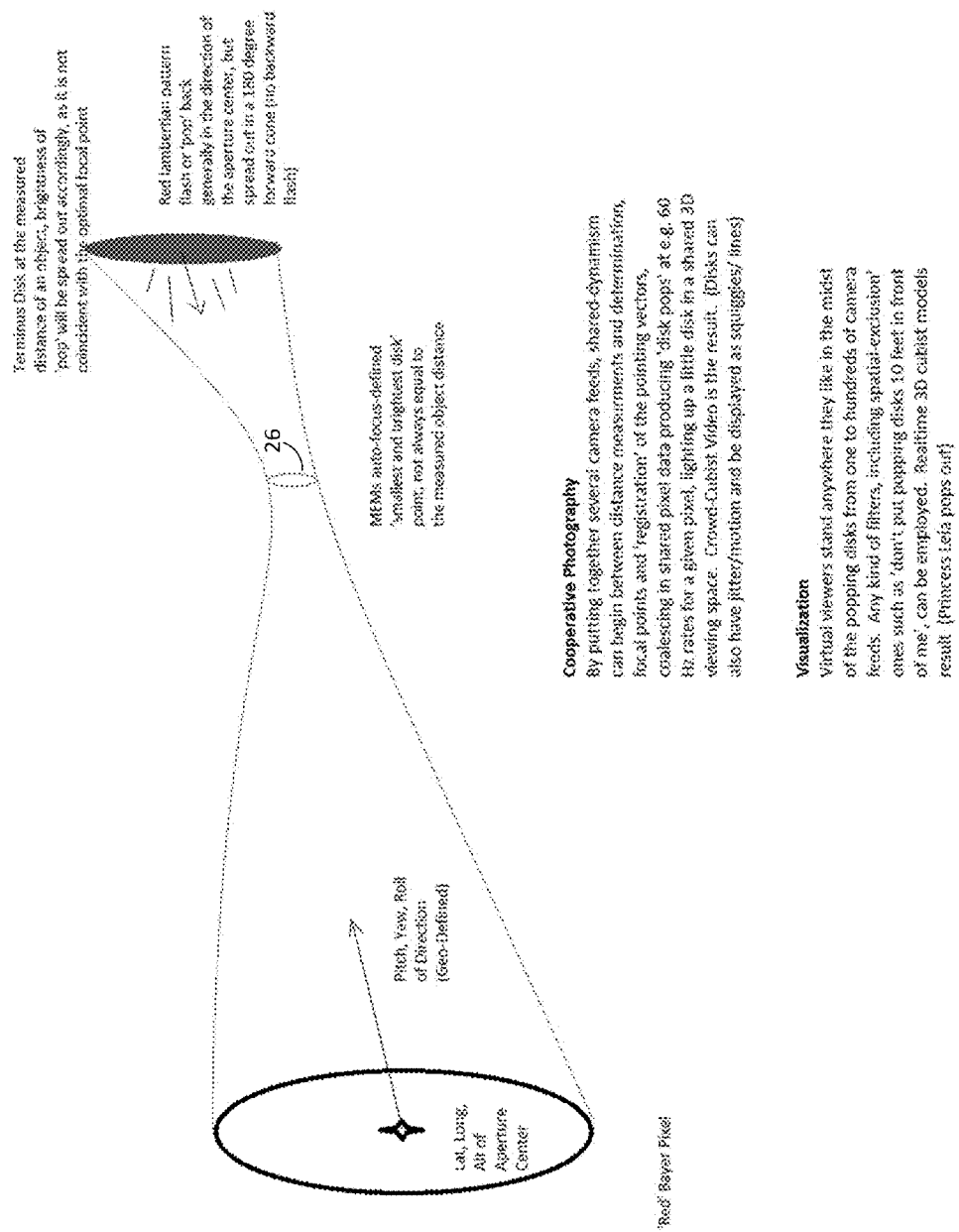
FIGS. 14A, 14B and 14C illustrate aspects of Geo-Timed (GT) pixels, including how rays passing from an image sensor and through a lens do not converge at a single point on an object plane, but instead form a thin waist.
Figure 14B:
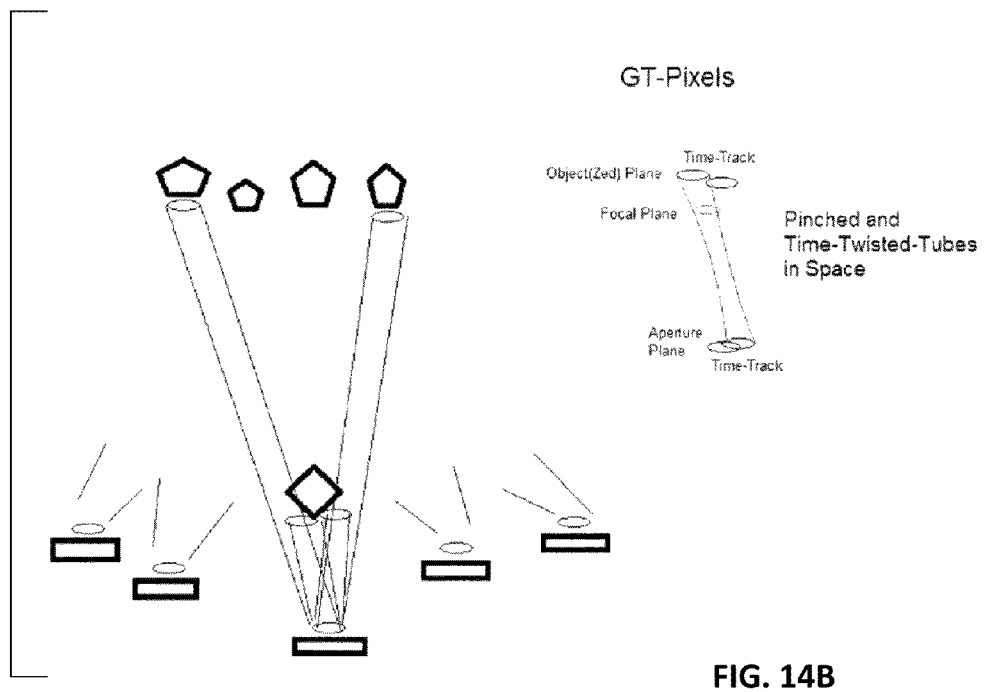
Figure 14C:
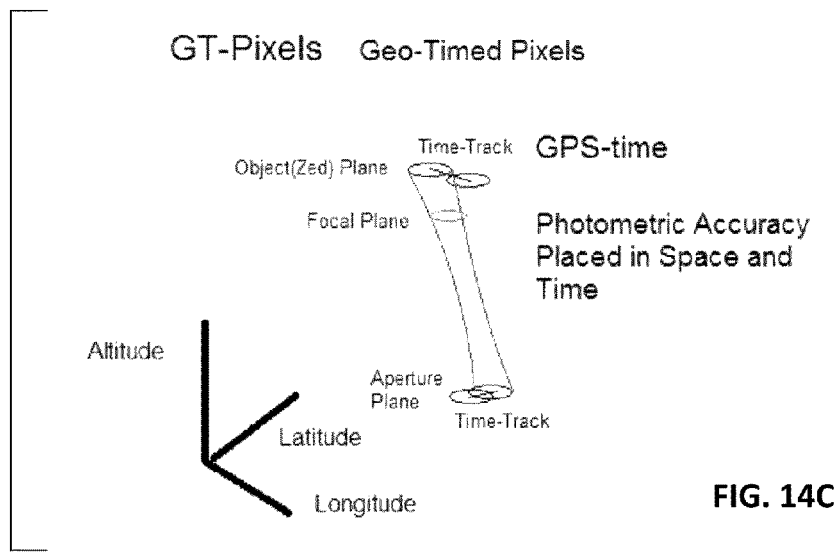

In practice, however, camera optics are not perfect. In fact, rays (e.g., rays 24) passing from the image sensor, through the lens, do not converge at a single point on the object plane. Instead, the rays are blurred somewhat, and cross in a region of a thin waist 26 before diverging again. (These rays are shown in 2D due to the nature of the illustration, but in actual fact the rays exist in three dimensions—effectively forming a tube 28 that narrows to a waist. FIGS. 14A-14C further illustrates the phenomenon.) Thus, a point on the image sensor plane actually corresponds to a small two-dimensional area on the object plane (i.e., a section through the ray tube). The camera optics' point spread function (PSF) defines the profile and extent of this blurring/spreading.

In a traditional photosensor, which comprises a rectangular array of square photodetectors, each photosensor pixel corresponds to a small patch of imagery on the object plane (ignoring lens distortion, etc.). For example, in FIG. 1, a single photosensor pixel may collect light from an area (patch) on the face of person A that is a tenth of an inch on a side. (This area is not strictly square; the PSF blurs the square photodetector shape into a slightly rounded shape on the object plane.)

At distances beyond the object plane, the rays 24 diverge (i.e., the ray tube 28 expands), causing a photosensor pixel to collect light from a larger area. For example, a photosensor pixel collecting light from the face of person B may collect light over a patch that is a quarter- or half-inch on a side. (A similar phenomenon applies to light gathered from subjects between the object plane and the camera.)

This patch area on the subject, from which a single photodetector collects light, may be termed a "disk," and is the projection of the photodetector, through the lens, onto the subject—taking into account the point spread function. It is essentially a section through the three-dimensional ray tube 28 corresponding to that photodetector.

While in a perfect optical system, all of the light from a point on the object plane 16 illuminates a single photodetector in the sensor, in a real optical system, this is not the case. Instead, light reflected from a single point on the object plane will illuminate one photodetector the most brightly, but will illuminate a neighborhood of adjoining photodetectors to a lesser degree (again, depending on the PSF). This phenomenon is much greater for subjects outside the object plane, such as person B. Light reflected from each point on person B may illuminate dozens of adjoining photodetectors in the sensor array—causing the familiar out-of-focus blur effect.

In a conjugate sense, the size of the disk projected on the subject, from which a single photodetector gathers light (e.g., a tenth of an inch on a side, or a half-inch on a side), similarly indicates the size of the area on the photosensor array that is illuminated by light from a single point on the subject.

Put another way, the intensity of light collected by a single photodetector, from a given area on an imaged subject (assuming uniform illumination and albedo (reflectance)), is a function of how far the subject is from the object plane. The more out-of-focus a subject, the more its reflected light will smear across multiple photodetectors, and the less it will contribute to the illumination of any single photodetector.

More particularly, the signal energy output from a single photodetector is roughly inversely proportional to the area of that photodetector's projected disk on the imaged subject.

Figure 2:
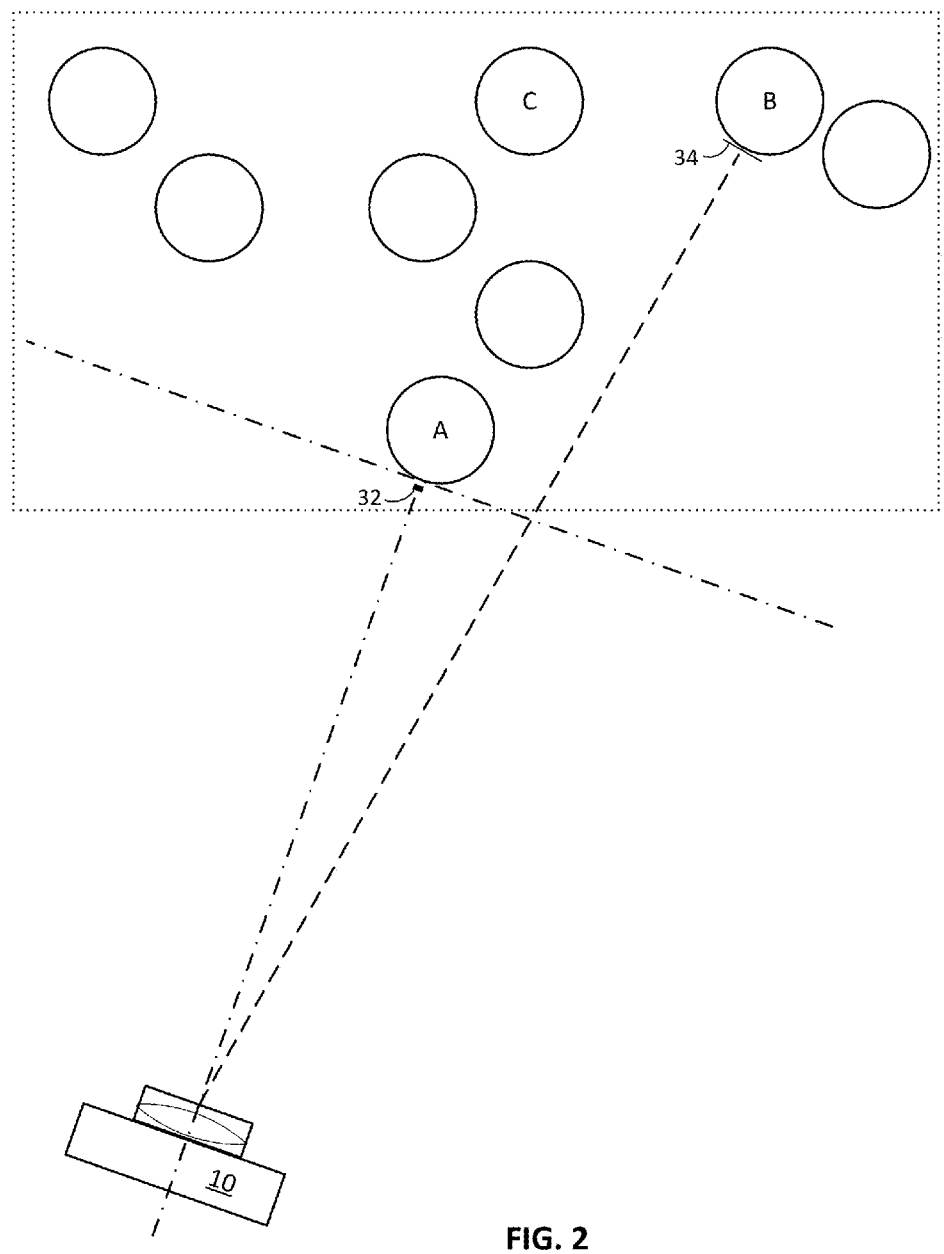
FIG. 2 shows further details of the FIG. 1 arrangement.

FIG. 2 illustrates this phenomenon by depicting certain of the projected disks 32, 34 on the subjects imaged by the camera. (Since it is a top-down view, the disks appear as straight lines.) The widths of the disks (i.e., the ~horizontal lengths of the depicted lines) show the widths of the ray tubes 28 emanating from the camera at those respective locations. Disk 32 is smaller (because it lies at the object plane), and disk 34 is larger. Both disks are shown as perpendicular to a ray from the camera lens (i.e., facing the camera).

The depicted thickness of each disk indicates the relative intensity of light gathered by a corresponding photodetector in the camera sensor. (The corresponding photodetectors are those at centers of neighborhoods of photodetectors that are illuminated, respectively, by disks 32, 34.) As is familiar, the intensity of light gathered by a photodetector is proportional to the number of photoelectrons produced by that photodetector. These electrons, in turn, are collected by a storage capacitor during an exposure interval. The voltage of that capacitor is sampled at the end of the exposure interval, and serves as the output signal from that photodetector.

Figure 3:
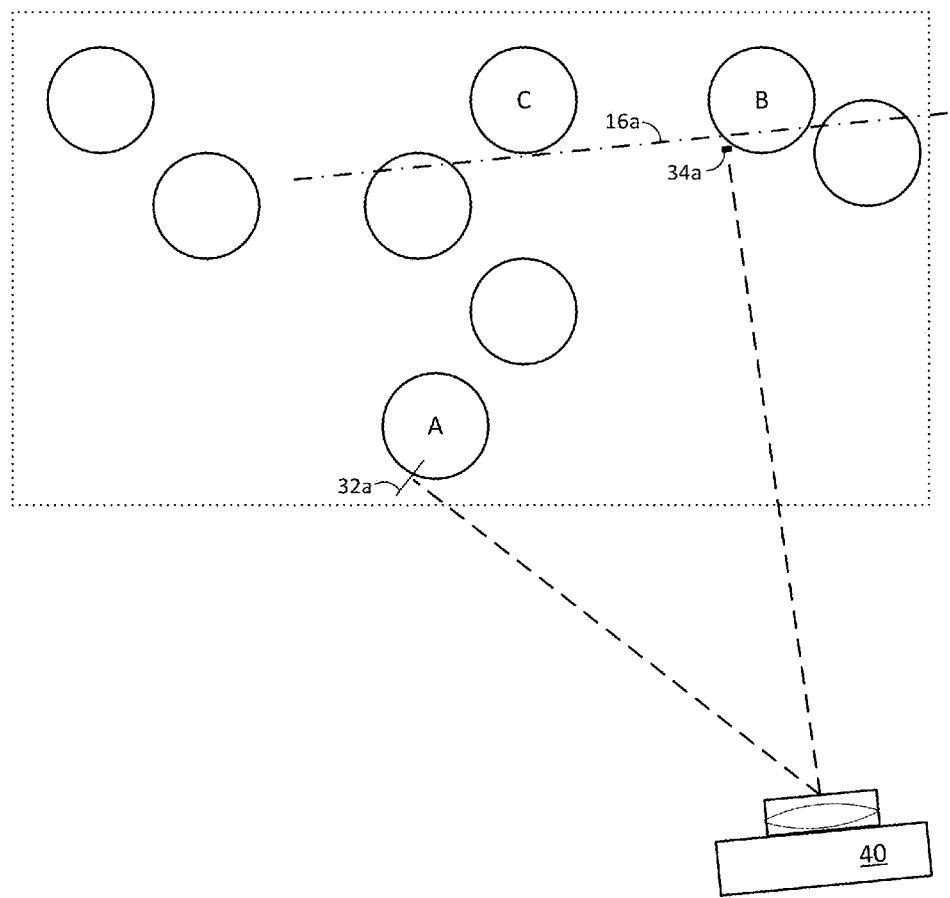
FIG. 3 is similar to FIG. 1, but employing a camera capturing an image of the group from a different viewpoint.

FIG. 3 shows a second camera 40 that is capturing imagery from the same group of people 12. The second camera is focused on a different object plane 16a—one that encompasses the face of person C. This object plane 16a is close to person B. Thus, a disk 34a projected from camera 40 onto person B (at the same X-, Y-, Z-location as disk 34 in FIG. 2) is relatively small, since it is near the waist of the corresponding ray tube. Its intensity is correspondingly large—as again indicated by the thickness of this line.

In contrast, person A is relatively distant from the object plane 16a. Thus, disk 32a projected onto person A (at the same location as disk 32 in FIG. 2) by a corresponding photodetector in the sensor array is relatively large. Its intensity is commensurately small.

Again, the disks shown in FIG. 3 face the camera lens. The intensity of light collected from the corresponding patches of the imaged scene additionally depends on the angle of these disks, relative to the surface orientation of the corresponding subject. For example, relatively little light is collected from the patch of person A at the position of disk 32a, because the surface normal from the person in this area is nearly parallel to the disk orientation. (Put another way, the ray from the camera is nearly tangential to the surface of the person in the location of this disk.) Thus, relatively little illumination is reflected from the subject at this location towards the camera.

In contrast, the disk 32 in FIG. 2 is nearly perpendicular to the surface normal from the person at that location. That is, the surface normal of the person nearly faces the camera 10. In this case, the light reflected from the subject to the camera is at a relative maximum.

Often, reflection is modeled as a Lambertian function, obeying Lambert's cosine law. This is one model that can be employed in applications of the present technology, although non-Lambertian reflectivity functions can be employed in other embodiments. (As information is gathered about a subject in the imaged scene, a different reflectivity model may be substituted for Lambertian, which may be used initially.)

Naturally, while only two projected disks are shown in FIG. 3 (and in FIG. 2), in actuality there are a number of disks equal to the number of photodetectors in the camera 40 sensor array. Each disk is projected onto a portion of the scene imaged by the camera. Each has a location in X-, Y- and Z-space. Each of these distances may be represented as a displacement from the origin of a reference coordinate system (e.g., centered at the camera). Each disk also has a camera-facing orientation, which may be quantified by a surface-normal vector in 3D space, with components in the X-, Y- and Z-directions. The position of each disk may thus be identified using these six parameters (or equivalents in other representations, such as polar representations).

The distance to each of these disks naturally depends on the scene being imaged. But their distribution in other dimensions (up/down, left/right, etc.) depends on the dimensions of the photosensor, and the camera's lens parameters.

The distance from a camera to each point in the imaged scene (i.e., to each of the projected disks) is directly provided by so-called RGBD (red-green-blue-depth) cameras, and other imaging systems that provide depth among the output data (or from which output data depth information can be discerned). Among these are time-of-flight cameras, plenoptic systems such as those marketed by Lytro, Raytrix, and Pelican Imaging, and systems—like Microsoft Kinect—that include a camera and a projector, where the projector illuminates the imaged scene with a pattern of structured light (which may be infrared), from which the distance to different points in the imaged scene can be determined. (Such technologies are expected soon to be available in smartphones and head-mounted imaging systems.)

Such distance information can also be produced using stereo imaging techniques, by reference to familiar parallax effects. The stereoscopic analysis can proceed with reference with distinctive features in the scene, which can be located and matched between different sets of image data. SIFT features are suitable.

Stereo imaging can be performed using a single camera that has two spaced-apart lenses on its body. More commonly, it is performed using a single lens camera that is moved to (or swept between) two or more different positions, or using two independent cameras whose spatial separation is known.

The positions of the cameras in these latter two arrangements can be determined by known geolocation techniques. GPS is most familiar, but requires access to satellite signals. Other geolocation techniques rely on signals from terrestrial sources, such as WiFi routers or cell phone towers, or from clocked signals emitted by phones and other mobile devices. In this latter regard see the technology detailed in applicant's U.S. Pat. Nos. 7,876,266 and 7,983,185, and published application 20090213828. Distance between two cameras can be measured using acoustic techniques as well, e.g., emitting synchronized radio and audio signals from one camera, and sensing the reception delay between these two signals at the other camera.

(While various depth sensing arrangements are identified, the present technology is not reliant on any particular one. Any such arrangement—whether now existing or hereafter developed—can be used.)

As noted, the extent of each projected disk depends on the point spread function of the camera, and the distance between the object plane and the subject in the scene onto which the disk is projected.

Often the point spread function of a camera is not known. However, absent other information, a Gaussian function may be presumed. (PSFs of cameras can be measured if desired; PSFs for certain cameras may be obtained from reference sources.)

Not only does each disk have a 6D location, and a PSF-based profile; it also has a temporal component. Each exposure captured by a camera can be defined by the point in time that the exposure commenced, and the point in time that the exposure ended. (In rolling shutter-based systems, such as most smartphones, the exposures may be of lines rather than the usual frames, since each line may have a different starting and ending temporal end point.)

Figure 4:
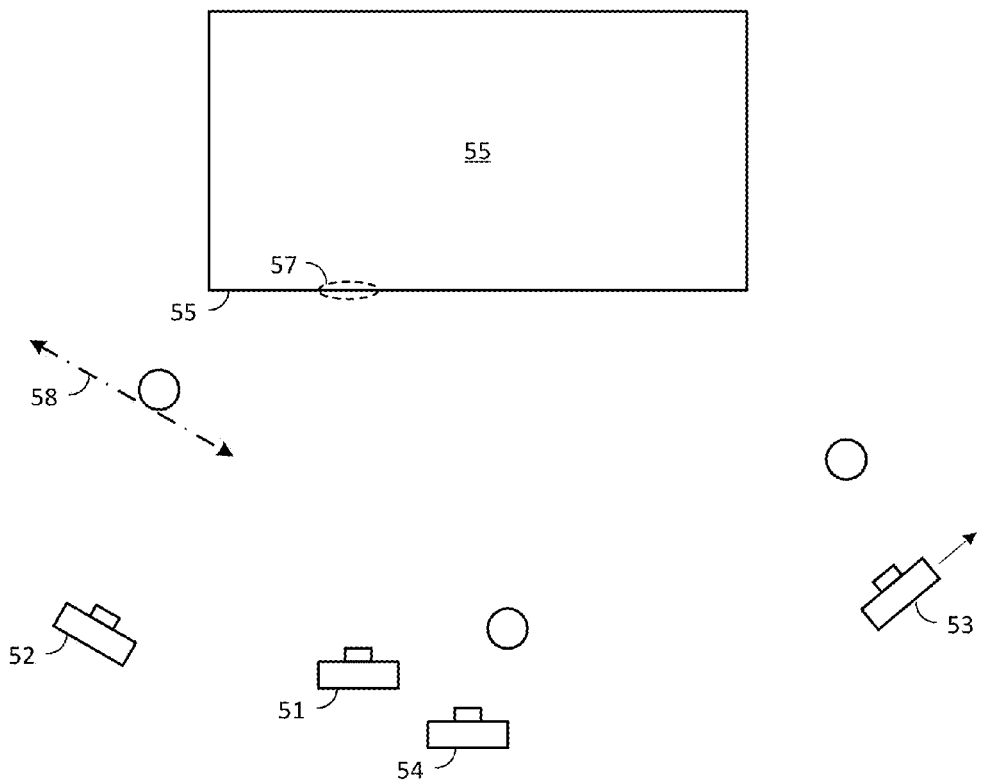
FIG. 4 shows multiple cameras capturing imagery of a scene that comprises a mural on a wall.

FIG. 4 is a top-down view illustrating multiple cameras 51, 52, 53 and 54 capturing imagery of a scene. The scene may include a planar component—such as a wall 55 of a building 56 on which a mural has been painted. Camera 51 is focused on the mural. The other cameras are focused on people (shown as circles), with the mural as a backdrop.

Figure 5:
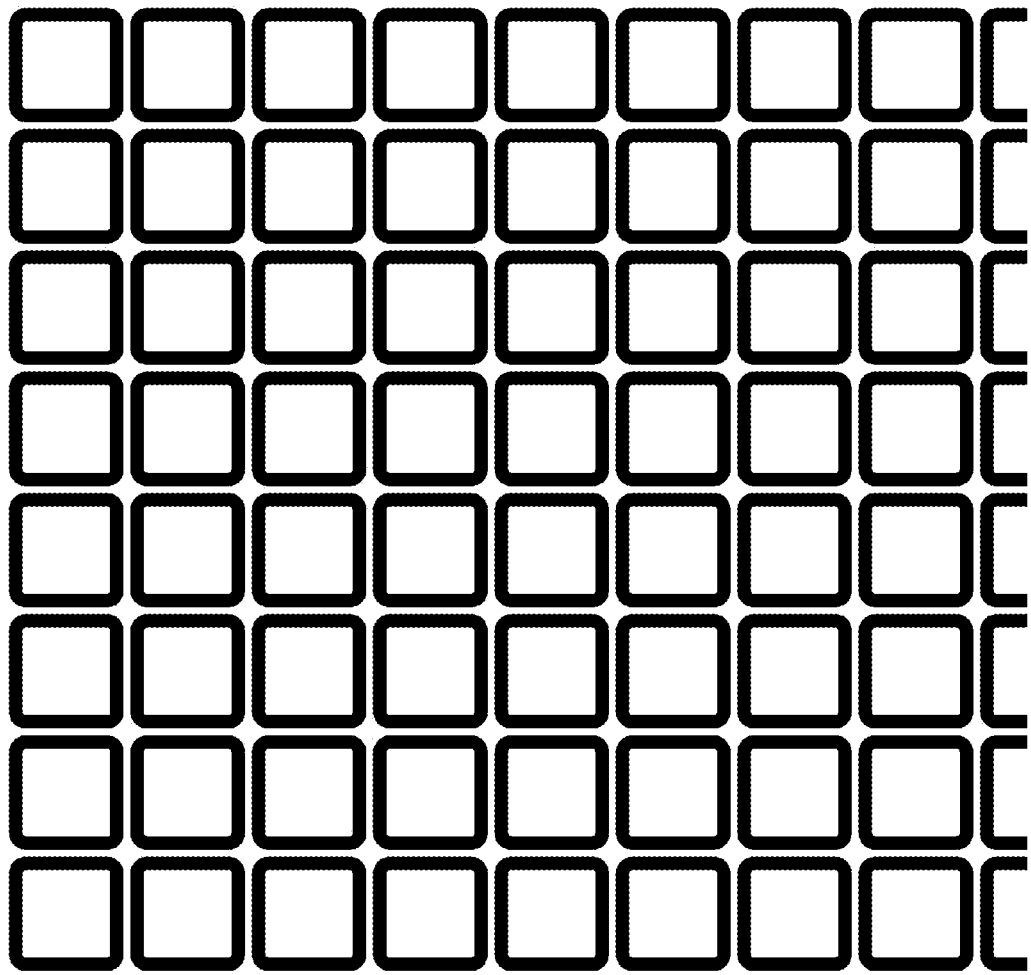
FIG. 5 shows an array of "disks" that are sampled by one of the cameras in FIG. 4.

The first camera, 51, is directed so that the lens is pointed squarely towards the mural, and is focused so that the mural lies in the object plane. In this case, the mural may be sampled by an array of disks—an excerpt of which is shown in FIG. 5 (corresponding to the small region of the wall indicated by oval 57). These disks are nearly square—with only slight rounding due to the PSF. The disks do not overlap because the photodetectors actually have small gaps between them on the semiconductor sensor array, so when projected on the scene, these gaps persist in the disk pattern. The disks of FIG. 5 are shown with thick line widths to graphically suggest that light gathered from these disks is of high intensity, since they are located near the camera's focused object plane.

Figure 6:
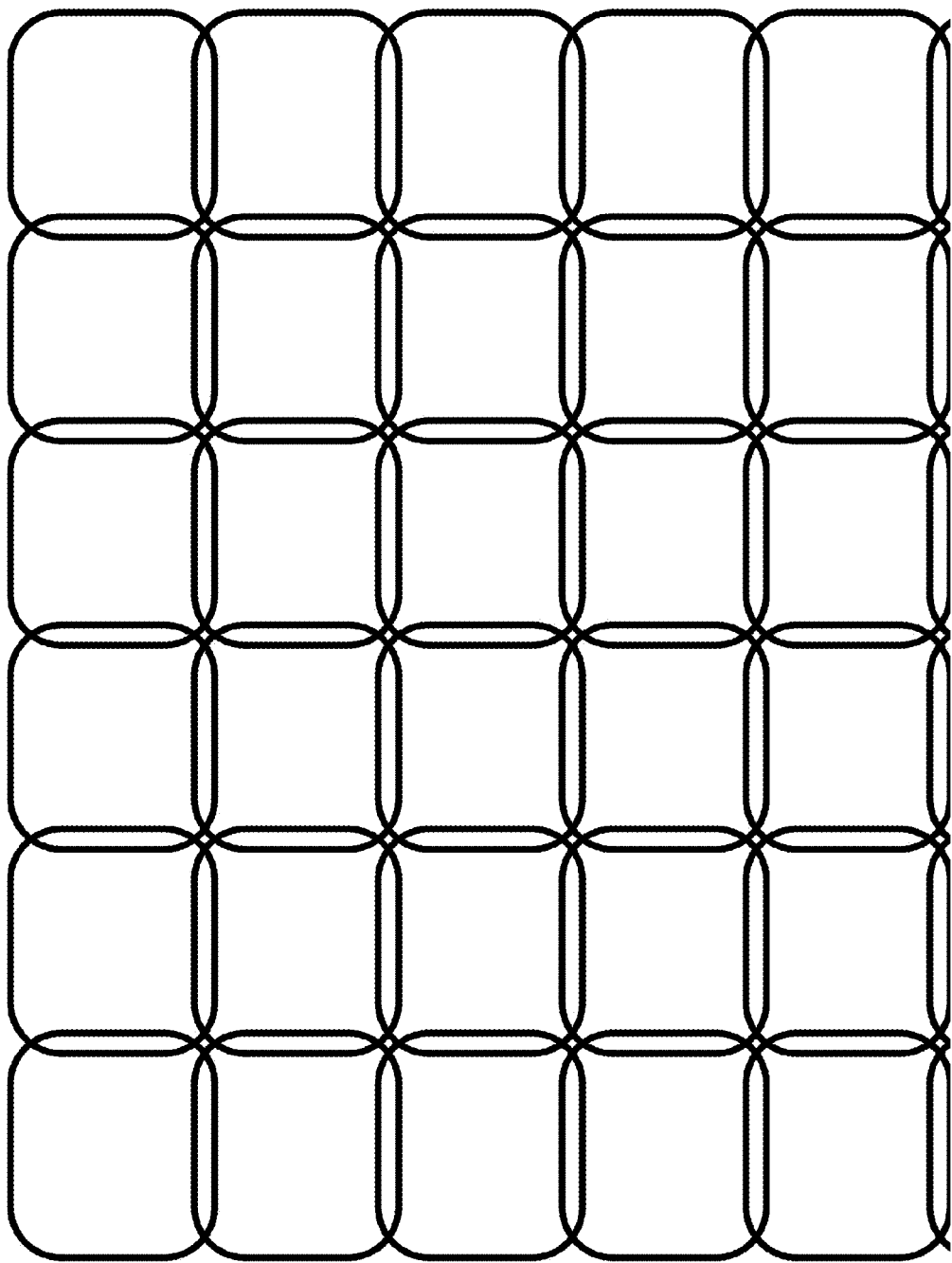
FIGS. 6, 7 and 8 each shows an array of disks that are projected onto the FIG. 4 scene by other cameras.

FIG. 6 illustrates an excerpt from an array of disks projected onto the same area 57 of the mural by the second camera, 52. However, this second camera is focused on an object plane (shown by the dashed line 58) that includes a person standing in front of the mural. Accordingly, the disks projected onto area 57 of the mural are not quite in focus. As a consequence, the disk profiles projected on the wall expand, causing some overlap between disks. Also, the intensity of gathered light is reduced due to the blurring.

The normally square disk shapes are horizontally foreshortened in FIG. 6 because the second camera is imaging the wall obliquely (i.e., the photosensor is not parallel to the mural). This is an expedient due to the representation of these disks in two dimensions on this sheet of drawings. To maintain consistency between FIG. 6 and FIG. 5 (and other figures to follow), the disks are shown as they are projected on the plane of the wall. The actual disk data would show these disks to be non-parallel to the wall (and to the printed page), but such feature is difficult to show in FIG. 6 (and becomes more difficult in figures to follow).

Figure 7:
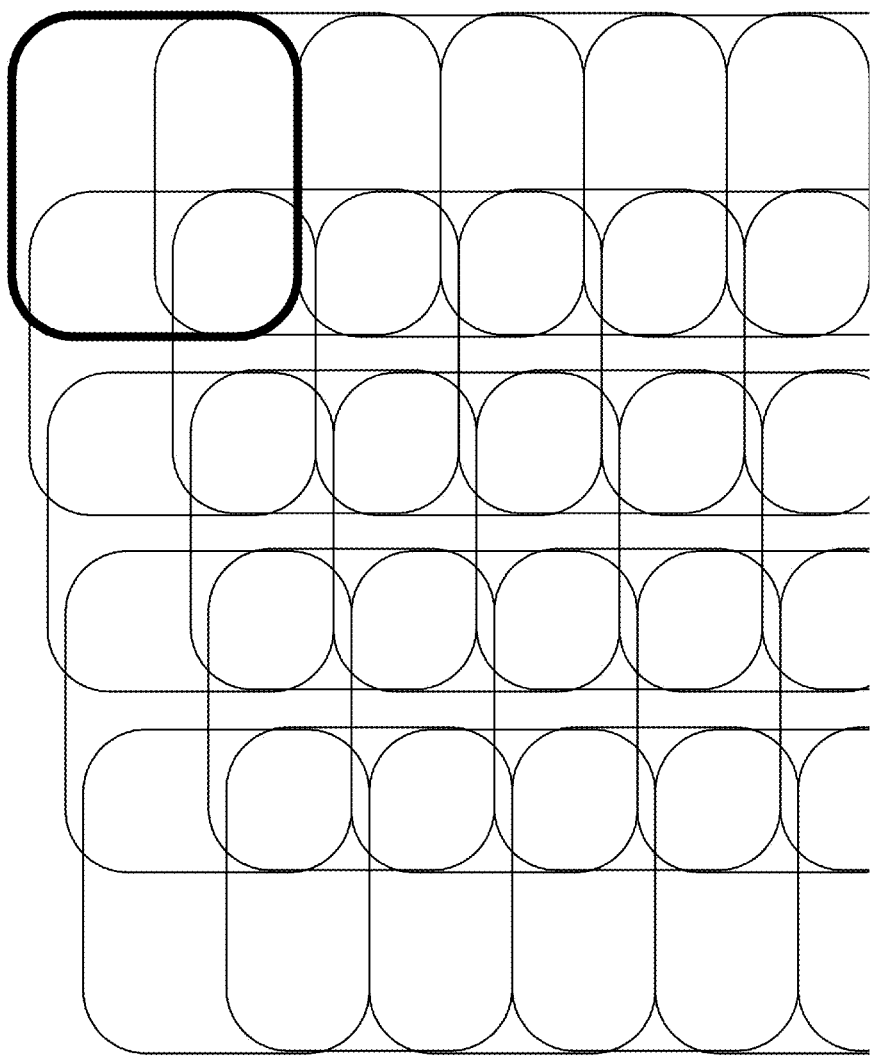

FIG. 7 illustrates an excerpt from an array of disks projected onto the mural by the third camera, 53. This camera is being moved slightly during the image capture, and the rolling shutter phenomenon causes successive lines of photodetectors to be spatially staggered when projected onto the scene. The mural portion of the imagery captured by the third camera is further out of focus, causing further expansion (and rounding) of the disks, with additional overlap. The intensity of light (again graphically indicated by the thickness of the lines) is less than in either FIG. 5 or 6, due to the poorer focus. (The disk in the upper left of FIG. 7 is presented in bold simply so its shape can be distinguished in the repetitive pattern.) Again, the third camera is viewing the mural obliquely, foreshortening the disks' horizontal dimension as represented in this drawing. (Again, in actuality, the disks face the third camera, which is not parallel to the wall.)

Figure 8:
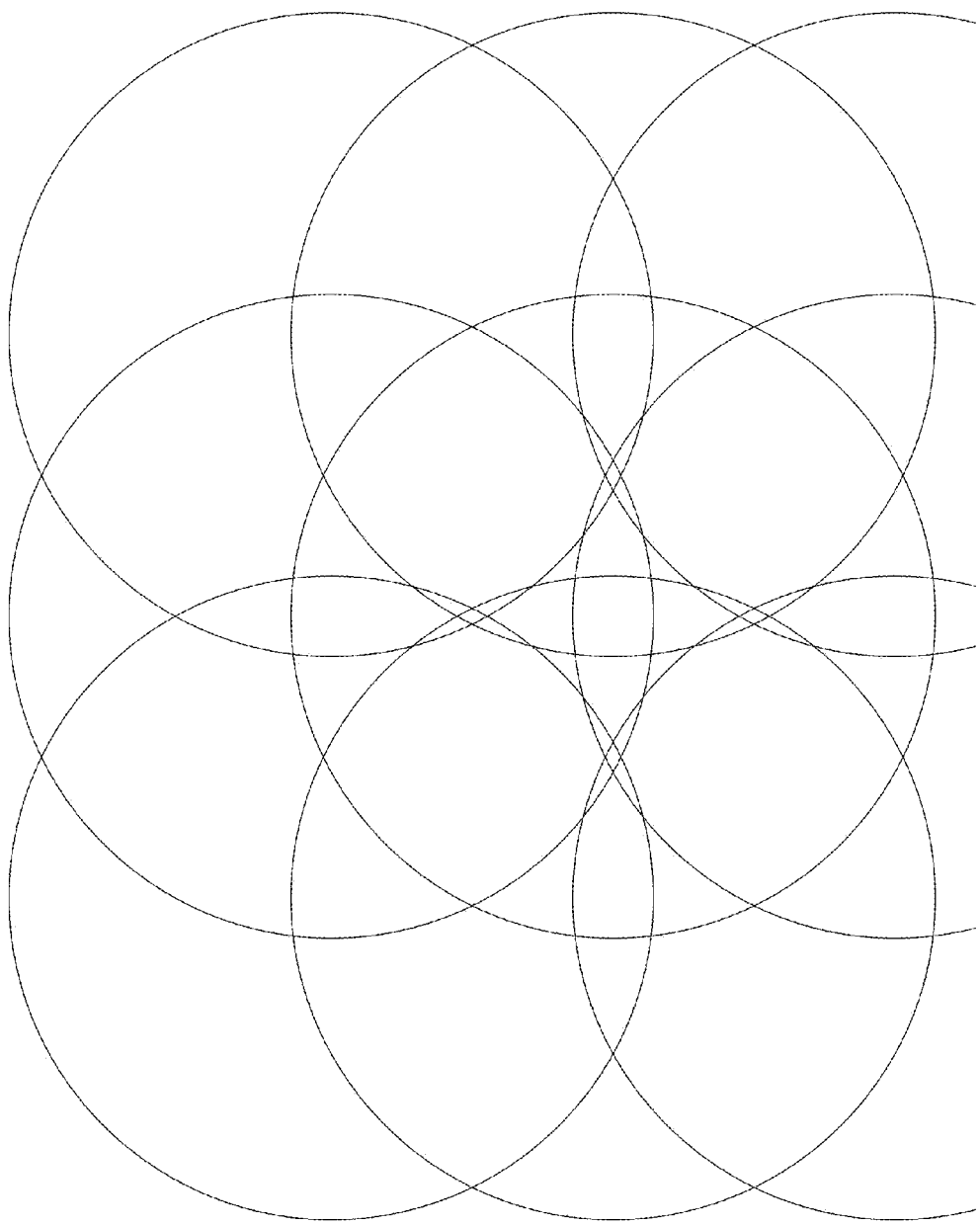

FIG. 8 illustrates some of the disks projected onto the mural by the fourth camera, 54. This camera is focused on a subject quite close to the lens, so the mural beyond is very out of focus. The square photodetectors are projected as circles due to the blurring. The blurring causes the intensity to be greatly diminished—indicated graphically by the thin lines in FIG. 8.

Figure 9:
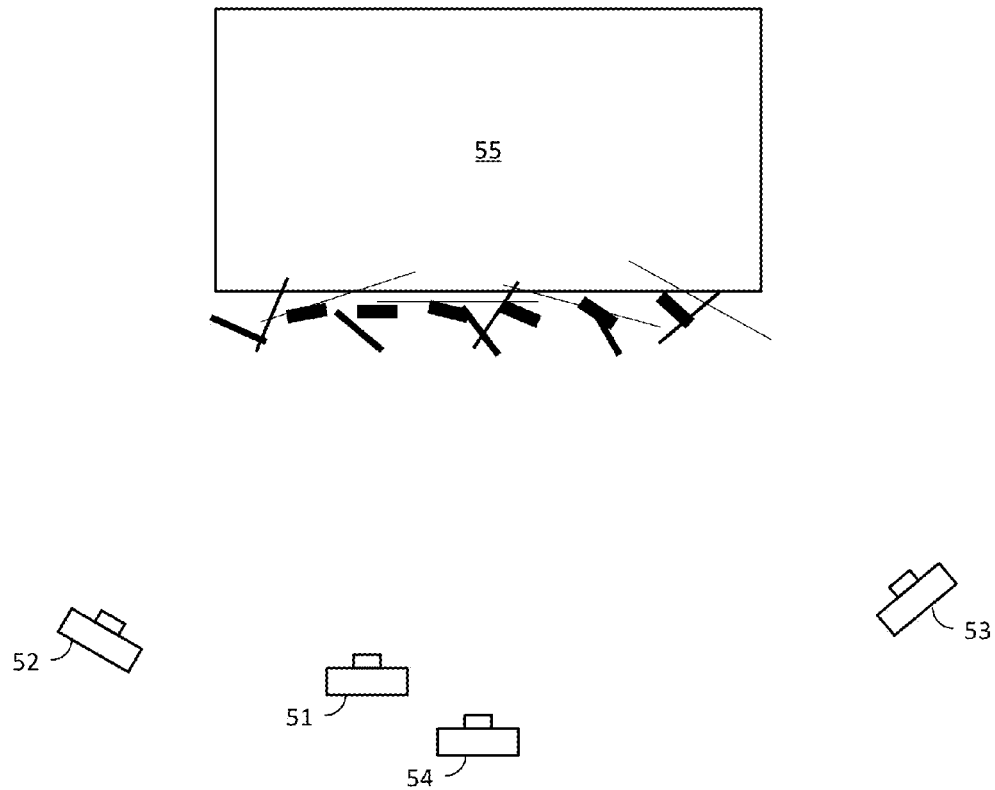
FIG. 9 shows how the disks captured by different cameras are differently oriented in 3D space, depending on the viewpoint of the corresponding camera.

FIG. 9 begins to show how the disks are angled—each pointing to its respective camera. The darkest lines represent the disks shown in FIG. 5, projected from camera 51. These disks lie in the camera's focused object plane. (In actuality, the disks are naturally smaller, and are more tightly packed.)

The next-boldest disks in FIG. 9 are projected from camera 52. Again, each faces to that camera (i.e., a surface normal passes through the center of the camera lens). They are larger, and less bold, than the disks associated with camera 51, because the mural is somewhat out of focus to this camera. (A truer rendering would show the disks to the right to be larger and thinner, since they are further from the object plane 58 of camera 52, but this nicety is omitted.)

Similarly, the next-boldest disks in FIG. 9 are projected from camera 53, and the faintest disks in FIG. 9 are projected from camera 54.

Figure 10:
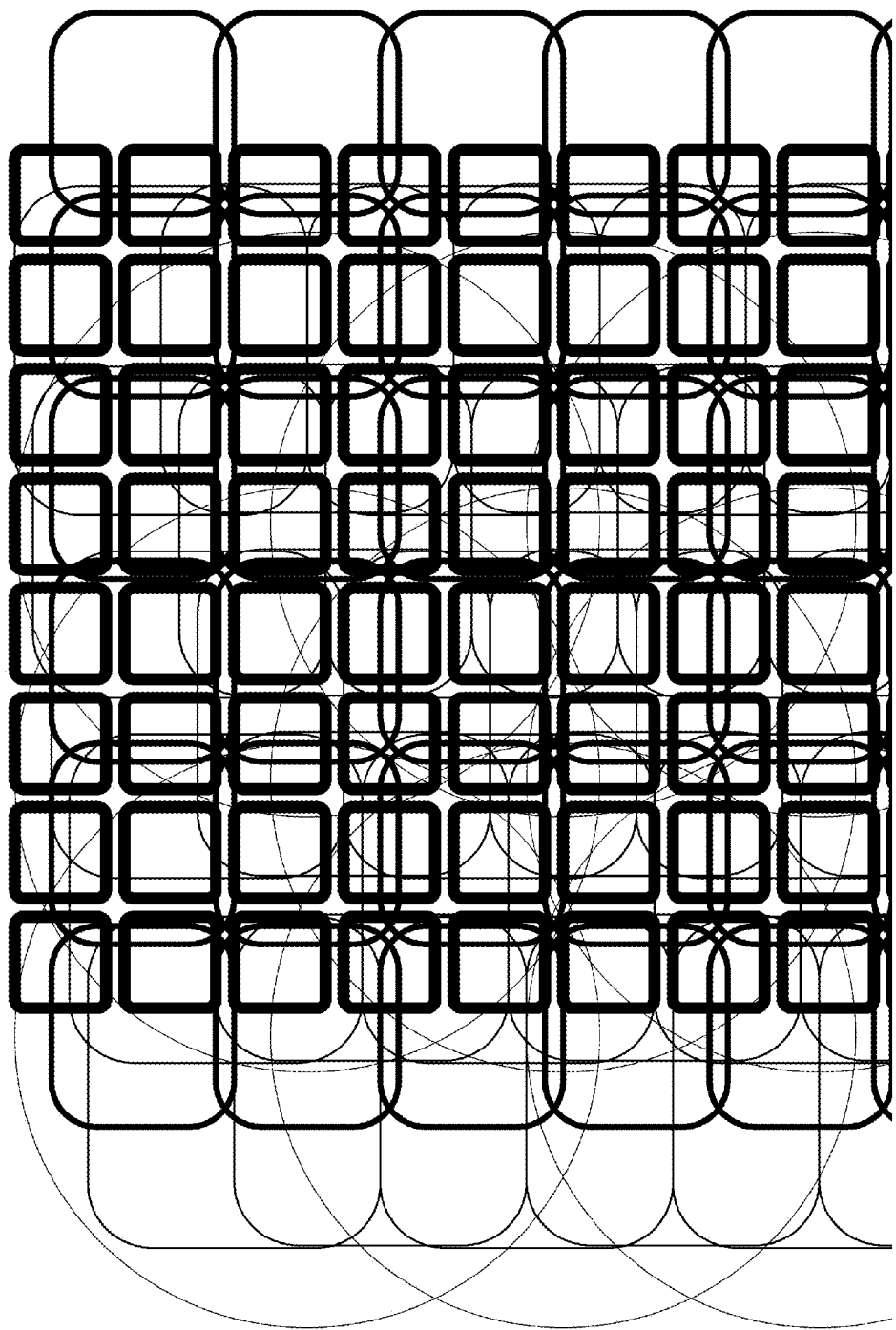
FIG. 10 shows the sampling of the FIG. 4 mural by different cameras—each projecting disks of different geometries on the scene.

In accordance with one aspect of the technology, information about these projected disks from all the cameras is fed to a cloud processor, where they are processed together. FIG. 10 shows the cacophony of disks that may be represented by the data fed to the cloud processor from cameras 51-54, after geometrical co-registration. (Geometrical co-registration reflects the fact that a disk at a given location in X-, Y-, Z-space must be associated with other disks at that same location. In one camera, such a disk may be due to a photodetector in the upper left of the camera's sensor array. In other camera, such a disk may be due to a photodetector at the center of the camera's sensor array. Etc.)

Assume now that, during the exposure of the first camera 51, a person passed six feet in front of the camera—blocking part of the mural from view. Instead of capturing light reflected from the mural, some of the photodetectors in the first camera captured light reflected from the nearer passing person.

Figure 11:
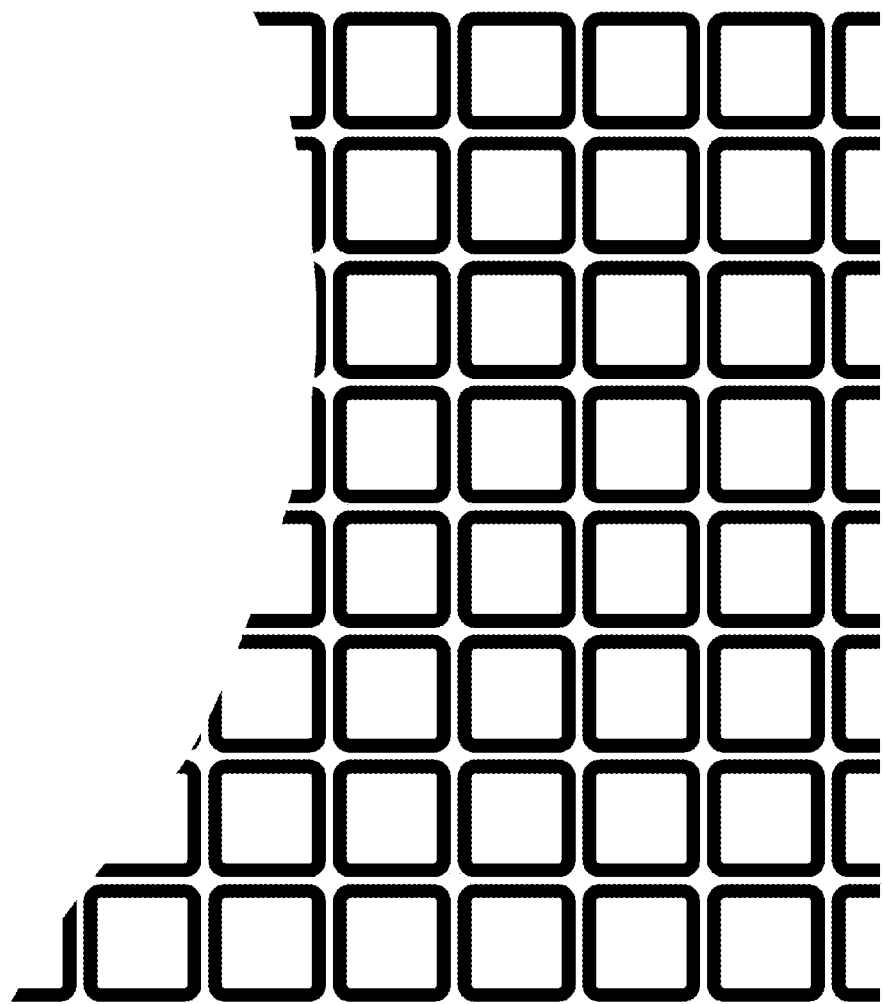
FIG. 11 shows how the sampled disks contributed by one camera to the FIG. 10 collection may become occluded, due to a person passing between the camera and the mural.
Figure 12:
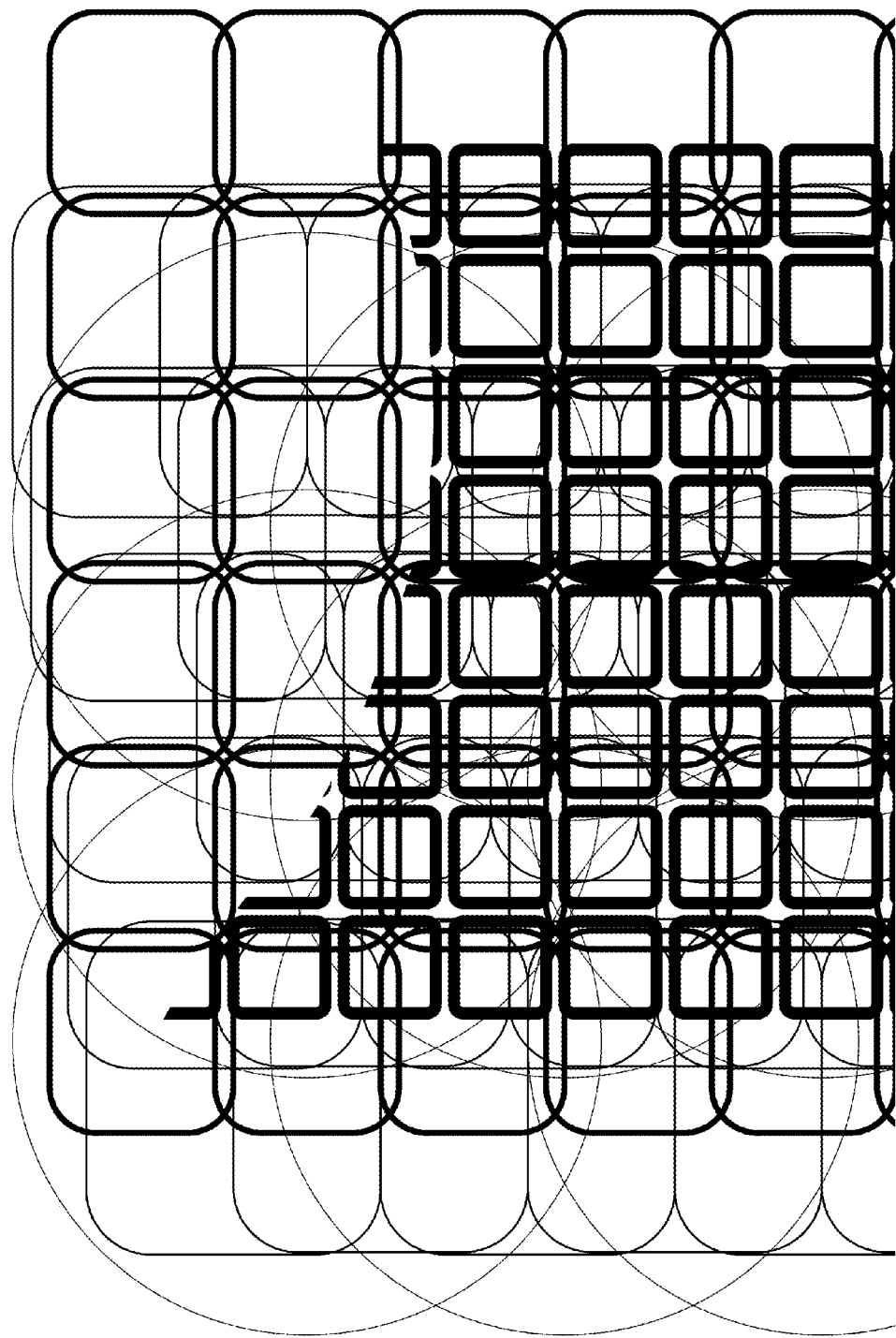
FIG. 12 is like FIG. 10, but showing the ensemble of projected disks when the person passes between one of the cameras and the mural.

By reference to depth map information, however, the passing person can be ignored. The cloud processor may be instructed to consider only information gathered from disks at a distance of ten feet or more from the cameras. So instead of the array of disks depicted in FIG. 4, an array of disks as shown in FIG. 11 may be processed from the first camera 51. In the context of data from the other cameras (similarly filtered to disks at least ten feet from the respective cameras), the ensemble of disks may be represented as shown in FIG. 12.

While some information was lost when the person passed in front of the first camera 51, the other cameras still captured imagery from the part of the mural not represented in the first camera data. A visually complete representation of the scene can still be produced.

In one particular embodiment, the cloud processor synthesizes a view of the scene by defining a virtual framing of the scene, and then dividing this frame into component picture cells. (This dividing typically results in a rectangular array of square picture cells, but this is not necessary. An array of hexagonal elements can be used. Or a stochastic pattern can be used. Etc.) A virtual camera viewpoint is also selected.

Figure 13:
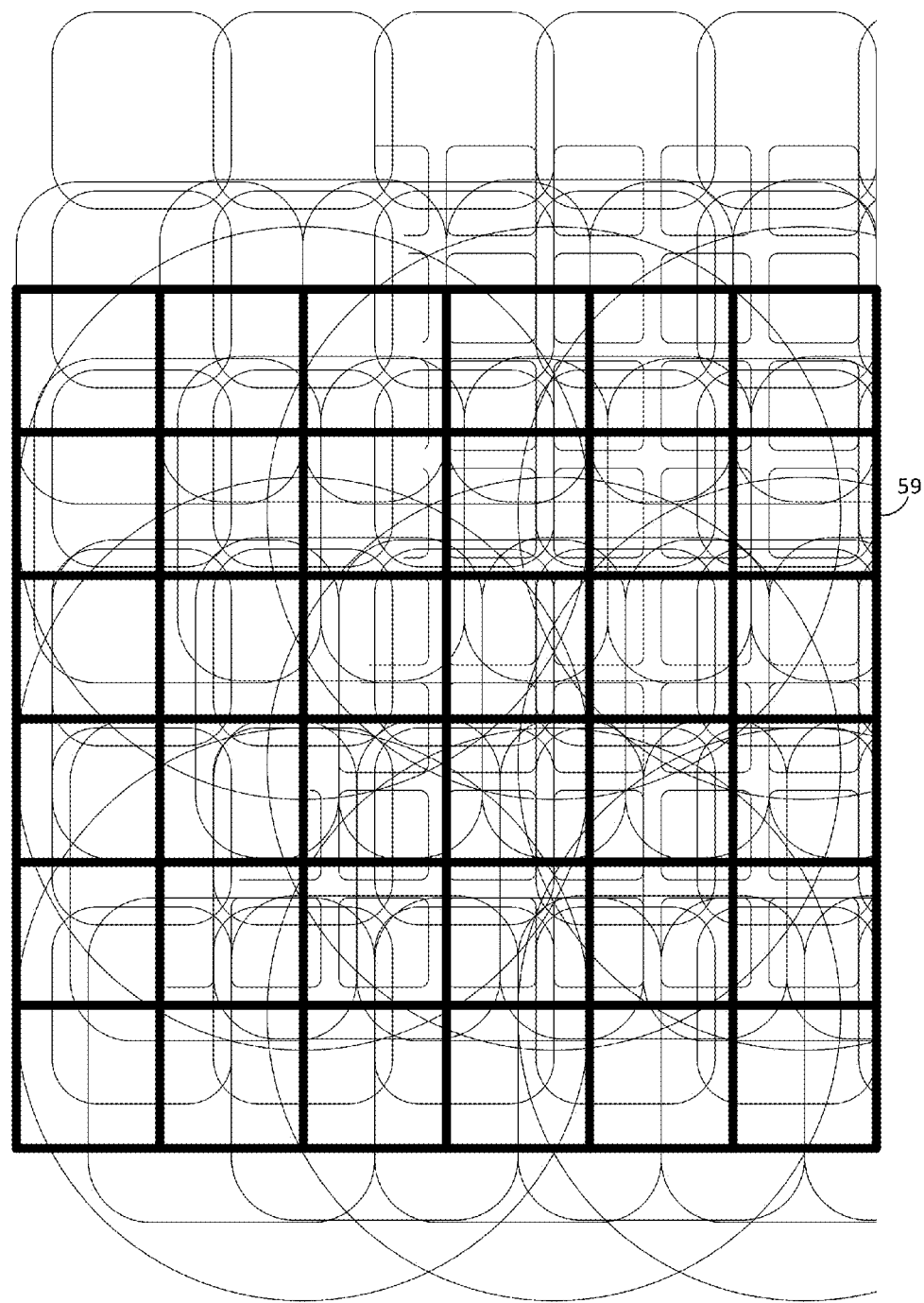
FIG. 13 shows component picture cells overlaid on the disk data from the various cameras (with the scene contribution from one camera occluded due to the passing person).

FIG. 13 shows component picture cells 59 (with boundaries shown in bold) overlaid on the geometrically registered disk data from cameras 51-54. (Again, part of the data from camera 51 is not included in this ensemble due to occlusion of the passing person.)

To generate an image, the cloud processor integrates—across the area of each cell, the contribution from each disk falling within the cell's boundary. As noted, the light intensity associated with some disks is relatively greater due to proximity to the contributing camera's focal plane—these disks contribute more to the cells' final value. The contribution of each disk to the final image also depends on the disk's orientation relative to the virtual viewpoint. If a Lambertian model is applied, then a disk facing the virtual viewpoint contributes 100% of its signal (energy) value to the component cell(s) in which it falls. As the orientation of a disk diverges from facing the virtual camera viewpoint, then the contribution is reduced in accordance with Lambert's cosine law.

Still further, the disks' contributions are not uniform across their extent. Each is brightest at its center, with intensity radially diminishing towards its periphery. This PSF-induced function is also taken into account when summing the contributions from areas of each disk falling within the boundary of a picture cell 59.

In the example case, not all camera disks contribute to the final product. For example, the disks of camera 51 that were projected onto the person passing in front of the camera did not contribute to corresponding parts of the aggregate image. Desirably, the value computed for each cell is scaled or otherwise adjusted to mitigate this effect. For example, the value of each cell may be divided by the number of cameras that contributed disks to computation of that cell's values. Thus, the value of most cells in the example case is divided by four, while the values of cells encompassing the occluded area of camera 51 are divided by three.

It will be recognized that temporal aspects have been largely ignored in the discussion so far. In one illustrative embodiment, the synthesized image corresponds to a particular instant in time. If this instant falls within the exposure period of a particular frame from a particular camera (by reference to the start/stop times of each frame exposure from each camera), then disks corresponding to that camera frame are used in synthesizing the image.

In another embodiment, the synthesized image corresponds to a particular interval of time, e.g., having a virtual exposure interval that commences at one point in time, and ends at a later point in time. In such embodiment, any disk data from a camera whose exposure interval overlaps with this virtual exposure interval is used. The contribution of the disk data can be scaled in accordance with the respective intervals of the actual camera exposure and the synthetic image exposure.

To illustrate, assume the actual exposure of camera 51 lasts two seconds, starting at 1:05:03 pm and ending at 1:05:05 pm. The cloud system may synthesize a cooperative group image based on a virtual exposure that is four seconds in length, starting at 1:05:04, and ending at 1:05:08. In this case, the contribution of the disk values from camera 51 to the component cells may be scaled by a factor of 0.5, to reflect that only half of the disk signal energy was gathered during the virtual exposure interval.

While the discussion so far has focused on still image cameras, the same principles are applicable to motion pictures. For example, one or more of cameras 51-54 may be a video camera. Moreover, the cameras need not be stationary; they may move as data is gathered. (Applicant's pending application Ser. No. 13/842,282, filed Mar. 15, 2013, details how a sensor can be cyclically shifted or tilted in one or two dimensions to reduce frame blurring in a moving camera.) Again, each frame of data is resolved as an array of discs projected onto the imaged scene—each with associated position and time information.

From such information a still image can be synthesized, corresponding to a particular viewpoint and time. Alternatively, a video can be synthesized. In fact, a video can be synthesized from a collection of still image information, gathered at different times. The view point can be moved during the synthesized video, or it may remain stationary.

Still further, the collected information can be processed to yield panoramic views—encompassing visual fields beyond that available to normal human vision. For examples fields of view of greater than 180, 225, 270, or 305 angles can be produced—even up to 360 degrees.

Moreover, the collected information may be processed to yield viewpoints that are not human-achievable without aid. For example, in the arrangement depicted in FIG. 4, the imagery captured by two or three or more of the cameras may encompass part of a grassy lawn in front of the building. Such information can be processed to yield a view of this part of the lawn, as if floating ten feet above it.

Some embodiments may collect data from a camera that is moved around a stationary object, such as by a person walking around a statue, capturing still frames or video from all sides.

The earlier example, dealing with a mural on a building, is relatively straightforward, due to the planar geometry involved. When a group of cameras contribute disk data projected onto subjects at different distances from the cameras, or when some cameras image the front of an object and others image the rear of the object, the cloud processor must resolve which of these features in the aggregate scene is visible from the virtual camera viewpoint.

This issue can be handled using techniques developed for computer graphics 3D rendering. Such techniques are known variously as hidden/visual surface determination, occlusion culling, and hidden surface removal.

Thus, for example, if one person's camera captures imagery depicting the front of a statue, while another person's camera captures imagery depicting the back of the statue, these CG techniques can be applied by the cloud processor to assure that visually impossible renderings, e.g., with features of the back visible from a front view, are avoided.

While reference was made to the synthetic image being rendered based on a virtual viewpoint and time, such an image can also be rendered with a virtual object (focal) plane. Subjects positioned at the virtual object plane can be rendered as described above. For subjects away from the object plane, a synthetic blur function can be applied in accordance with the depicted subjects' distance from the virtual object plane.

Alternatively, the information collected by the cloud processor can render an image in which depicted subjects are in focus—regardless of their distances from the virtual viewpoint. Doing so typically requires that the ensemble of collected disk information include information for disks projected onto each subject from cameras where such subjects were near the cameras' respective object planes.

Additional Remarks

In an example given above, time was specified to the second. In actual implementations, resolution much finer than a second are typically employed, e.g., less than a tenth- or hundredth-of-a-second, down into the millisecond and even microsecond range for some embodiments.

The foregoing discussion characterized the disks in terms of their locations in X-, Y- and Z-, and their orientations by reference to tilts in those dimensions. In actual implementation, the location of each disk will more typically be indicated by a vector from the camera lens to the disk, characterized by the vector length, and its azimuth and elevation. These latter two parameters are fixed for each photodetector in a photosensor, assuming fixed lens parameters.

In an illustrative embodiment, a camera may send information to the cloud processor identifying the camera type (e.g., an iPhone 5 camera or a Samsung VX-8300 camera). The processor uses this information to access stored reference data about that model of camera, such as the photosensor dimensions, the sizes and layout of the component photodetectors, the lens focal length, etc. The camera also sends exposure-specific metadata to the cloud processor with the captured image information. This metadata can include a digital zoom factor, lens f-number, flash parameters, color space, etc. A great variety of such metadata may be sent, depending on the particular implementation; the EXIF standard supports a long list of camera, exposure and imagery parameters.

The camera also sends information detailing its own position, e.g., by location and orientation. The former may be represented by latitude, longitude and elevation. The latter may be represented by the azimuth and elevation at which the camera is directed, and any tilt of the camera in the orthogonal dimension. Sometimes these latter parameters are termed yaw, pitch and roll.

(Camera position can be determined using GPS and other techniques noted above. Camera position information can additionally or alternatively be discerned by reference to MEMS sensors in the phone, such as 3D magnetometers, 3D gyroscopes, accelerometers, etc.)

Given the foregoing information as a baseline, the six components of disk position information (e.g., X-, Y-, and Z-location data, and the three dimensions of orientation data), needn't be sent by the camera to the cloud processor for each disk. Instead, the distance information alone will suffice; the other parameters characterizing the location of a disk can be geometrically derived from information about the photosensor, the lens, and the camera position. This latter information may be sent only once for each frame of data (or even less frequently).

The disk information typically includes luminance and chrominance information in some color space representation (e.g., RGB, YUV, etc.). As indicated, these parameters are taken from the output of the photodetector to which the disk corresponds. Profile information about the disk, such as its shape and signal distribution across the disk's area, are typically not sent by the camera to the cloud. Instead, the cloud processor accesses stored PSF information for the indicated camera (or, absent such information, uses a default PSF). It uses this reference information, in conjunction with the information about the camera parameters, to determine the shape and profile of the disks.

In an example given above, disks closer than ten feet from each camera were disregarded in synthesizing an output image. This is one approach to dealing with occlusions near cameras (e.g., as when a fan at a sporting event stands up in front of a person capturing imagery).

Another approach is to identify a scene volume of interest. Consider a basketball game, being imaged by persons in arena seating around court. The scene of interest is what happens on the court. In this case, the scene of interest is a rectangular volume defined by the floor and side boundaries of the basketball court, rising up to an elevation of 12 or 15 feet. In assembling composite imagery, the cloud processor may consider only disks positioned in that scene volume. If one person's view of a player is momentarily blocked by a popcorn vendor, no information is contributed from that person's camera to the rendering of that player, for the moment of occlusion. (But neither is imagery of the vendor used in the rendering.)

Definition of the scene volume of interest needn't be done at the time of data acquisition. The cameras in the arena can contribute their respective torrents of information to the cloud processor in real time—without any filtering. An instant—or a week—later, when a viewer wants a rendering from this data, the volume of interest can be specified.

In one embodiment, scene volumes are always cuboid in shape, with sidewalls that rise vertically from ground level. In this case, a user can specify the desired volume by identifying its height, and the locations of two opposing corners at ground level. The latter two data can be indicated by taps at corresponding locations on a touch screen, where a representative key frame from the data is presented. The height may similarly be indicated by a tap (e.g., locating the upper corner above one of the two ground corners), or a numeric parameter (e.g., 15 feet) can be entered into a dialog box.

As noted, the user may also specify a desired viewpoint into the visual data. Other parameters, such as the field of view, and the desired resolution of the output image product, can also be specified.

In other embodiments, the camera actively filters the information sent to the cloud, omitting data corresponding to disks outside a desired viewing volume.

In common experience, a camera's viewfinder presents imagery being captured by the camera's sensor at that moment. But it need not be so. One embodiment of a camera using the present technology has a mode in which the viewfinder shows a cloud-produced nearly-realtime representation of the scene, synthesized from group camera data and rendered from the camera's viewpoint. (A slight delay is caused by transmission and data processing latencies, but this is typically less than 0.5, 1 or 2 seconds.) Imagery from the camera's sensor is streamed to the cloud without depiction on the viewfinder. Much of the rendering may be based on data streamed from that camera, but occlusions, jostling, autofocus errors, momentary over- and under-exposure, and other undesired artifacts may all be removed in the rendering produced by the cloud processor. At a basketball game, a user tired of holding a camera up to follow the action may simply point the camera to the ground, and view the scene based on data from other cameras. For a different perspective, the person may occasionally switch to a rendering viewpoint from behind the home team's basket, or floating above center court. (Again, a touch screen UI can be employed to locate the desired viewpoint.)

While it is desirable that the camera associate depth information with each photodetector in the camera sensor, this is not essential. Depth information for a scene can be sampled more sparsely than the image information, and can be interpolated to yield a depth parameter for each photodetector.

Moreover, it is not essential that depth information for a scene be collected by the same apparatus that collects image information for a scene. (A simple example is use of a Kinect sensor distinct from a camera.) More generally, the depth information needn't even be collected by an apparatus that is co-located with the apparatus that collects image information. A basketball arena, for example, may have three or more depth sensing apparatuses fixed at known positions, viewing the court and seating areas. From such information a 3D model of the space and participants can be produced. (The raw depth map information from the fixed sensors can be sent to the cloud processor, which produces the 3D model, or the 3D model can be produced locally, and sent to the cloud processor.) The positions of spectator-held cameras are also tracked, as described elsewhere. Given such information, and information about the cameras and their optics, depth information can be associated with each photodetector in each camera. (E.g., the path of an optical ray from a photodetector, through a camera lens, to where it intersects the model of the 3D surface, is determined.)

Depth sensing can be omitted altogether in some embodiments. Where its use is desired, scene depth can be roughly estimated by other means, such as blurriness metrics calculated for different regions of an image, e.g., based on local image contrast. (If imagery from two cameras is available, stereo techniques can be employed to discern depth, even if neither camera alone has any depth-sensing capability.)

The artisan will recognize that point spread functions are theoretically infinite in extent, leading to disks that are infinite in width. In practical application, a disk may be bounded by a perimeter than encompasses most of the energy, such as at least 50%, 90%, 96%, 99%, etc.

As noted, plenoptic cameras are available, e.g., from Lytro, Inc., Pelican Imaging Corp., and Raytrix, GmbH. Some of their work is detailed in patent publications 20110122308, 20110080487, 20110069189, 20070252074, 20080266655, 20100026852, 20100265385, 20080131019 and WO/2010/121637. The major consumer camera manufacturers are also understood to have prototyped such products, as has Adobe Systems, Inc. Some of Adobe's work in this field is detailed in U.S. Pat. Nos. 7,620,309, 7,949,252, 7,962,033.

(Artisans sometimes draw certain distinctions between plenoptic sensors, light field sensors, radiance cameras, and multi-aperture sensors. Each of these is suitable for use in embodiments of the present technology; each should be construed so as to encompass the others.)

While the foregoing discussion assumed the cameras that contribute imagery to the cloud processor were stationary, they can be in motion as well. (Handheld cameras may be treated as in motion, due to hand-jitter, etc.) Similarly, the subject(s) can be in motion. The discussion next takes a second pass at the subject matter—introducing a new class of visualization, coined "crowd-cubist visualization." So-called "raw popping disk" visualization at the core of crowd-cubist information display quickly leads to filtered, shaped and structured visualization all borrowing decades of prior art for cleaning-up (or jazzing-up) and enhancing photographs.

Second Pass

Incalculable technical effort and investment has gone into helping ordinary people be able to produce extraordinarily high quality pictures and video. Hassalblads for everyone, and a Panavision movie camera in every closet. The technical underpinnings of the initially-modest smartphone camera continue their impressive quality advance. Yet professionals semi-rightly scoff at such at the notion of democratized brilliant photography, knowing that a great camera is just the yin of the art-as-yang pair. Color correction, jitter-mitigation, red-eye removal, instagram-esque jazzifying of social photographs . . . these all can aid the masses in taking better and better pictures, but there remains the richer worlds of subject-matter and treatment as the unlimited landscape ahead.

More toward the artistry and human cultural side of photography and motion pictures, new categories of photography have come onto the scene, recently including computational photography, depth-based photography, web-synthesis photography a la Photosynth, geo-tagged photography (a kind of new class and artistry), "SpinCam" photography of objects and panoramas (see, e.g., patent publication 20130250048), and certainly "analytic" photography trying to move beyond simply the human color vision model of photography (see, e.g., patent application 20130308045); all of these merit mention. It is not unfair to say all of these forms of photography are the prelude for the present technology, in that each in its own way is enhancing the quality of image taking and image presentation, while expanding the core experience of the temporal-visual world. Extending this dust storm of technical development firmly into multiple concurrent photography, information sharing and then crowd-cubist display, cooperative photography wishes to join the party.

Imagine you are a parent attending the pre-prom obligatory photo-fest with your kid, their date, and eight other teen-couples to boot. Lots of parents—all with smartphones held proudly forth on the now-milling, now-posing couples, sometimes alone, then ad hoc pairings and then of course the 30 minutes of the big group shots. The prairie dog cameras shooting up and down and all around in the process, also culminating in a large group of parents lined opposite the smaller group of kids, most cameras now in action.

Some bleeding edge parent just caught wind of this new cooperative photography, and she and her husband have got the app on their phones and have tuned into the web service supporting it. She also got her best friend and her husband to do the same. The app has all the latest "best on the planet" typical photo and video modes, replete with snapping shots and viewing them, correcting them, same with video modes and reviews, all the usual stuff. But it also now has this "share pixels" BIG button which is what got them to take notice of cooperative photography in the first place. All four parents have pushed this button to the "green check" and at first they don't notice much, they just keep on using their preferred photo app like they always have.

Then comes the big test to see if this damn new stuff will work. Betty, the original enterprising parent previously introduced, asks her husband and the other two parents to randomly disperse themselves amongst the parental/grandparental/siblings herd of audience and photographers. Her only instructions to the three: just try to keep a steady video shot of the whole teen-couple group for a few minutes while I test this cooperative thing. They disperse and she sees they are all doing the pseudo-religious smartphone blessing of the couples. Then she presses the second button on her new app which changes the mode from "photo" or "video" into "cooperative." A tingle of adrenalin surprises her.

What she first sees looks pretty close to her own video mode but it's not quite the same, having some strange ethereal lighting kind of quality that's quite noticeable but certainly not objectionable . . . it's intriguing. She has not played with the advanced settings of cooperative photography and has its internal mode set to "standard," where by and large her viewpoint and her own "pixel feed" dominates what she sees on her own phone. Just to check that other feeds are active, she checks the "standard filtered cubist" mode as instructed in her online help as a way to check to see if the fuller cooperative modalities are being fired up, and . . . whoa Nelly . . . the group of couples she now sees on her screen are definitely all still there, but this live view of them defies any experience of a live video she has ever seen. Welcome, Betty, to stage one crowd-cubism.

The online help section (first-time users section as it were) has prepared her for this stage one viewing but the writers of this section also have suggested, hey, you can come back to this standard cubist mode later, and many more modes, the initial idea was to just see if the pipes were working. Why don't you now get back to just seeing how this can help enhance your own videos. She does so and puts it back into the default internal mode called "enhanced personal video." Sure enough, the somewhat hard to describe "ethereal sheen" added to her own "pretty close to normal" video view shows up once again. The manual also assured here there are plenty of ways to deal with the delta between her "accustomed video mode" and this new "cooperatively enhance personal video mode," so, don't sweat the new strangeness to what she is seeing.

She raises a thumbs up signal to her cohorts with a big grin on her face, giving them the sign that the damn thing seems to be kinda working. They are all still in their normal video modes only with their "green cooperative check" on as well. She was crafty by not telling any of the three that they too could be "going cubist" but she didn't want them distracted; this is a test after all and if the technology turns out to be dull or not work, she'll just quietly discard it and none will be the wiser, but so far so good, maybe she won't have to explain later over glasses of wine that it all was a dud.

On to the next text, the "magic test" as the first-time user manual had fun in calling it. She starts to walk through the audience-herd holding her camera up and viewing the "cooperative video (standard-personal) mode." As she moves she notices that the inexplicable ethereal sheen also indescribably changes its etherealness through movement. Weird. But very cool.

Then "the event" happens. She didn't see the 5 year old boy staring up at her in wonder, curios to see when she would notice him when sure enough, she stumbles on him and quickly and embarrassingly says wooo and apologizes. But her video just kept going on the group, WHAT?

She puts her camera back onto the group and there is yet another kind of "ethereal jump" in the view of the couples when her camera gets back onto the couples, but it was rather subtle and yet again nothing like anything she's ever seen before. Hang on, then, how did THAT work? She then quickly points her camera down toward the ground and then back to the couples all within one second, and sure enough her video remains steady except for the yet-new ethereal discontinuity. Wow, this thing really is doing what they said it would do.

Then finally it was time for "the Really Big Test!" again as the first time user manual playfully calls it.

"Find some tall person whose head will get in your way as you slide past them" suggests the first time manual. OK, there is Harry over there, 6 foot 5 Harry the Aerospace engineer. Luckily Harry doesn't really act too odd (actually doesn't barely even notice) as Betty raises her camera up to roughly Harry's head's height, then walks behind him roughly ten feet back. As she's watching the displayed video with its "now accustomed' motion video etherealism, whoa, yet-yet another new ethereal form shows up as she passes Harry's head obstructing as it does only a portion of her personal camera view. A very vague, almost Kirlian photography-esque shaping of the previous ethereal effects seem to show up in her video precisely matched to Harry's head, BUT, the overall video scene of the couples remains in place and it's as if she's actually looking at the couples through Harry's head. As she sits there moving this camera way above her head from one side of Harry's head to the other, all the while watching this crazier-still phenomena showing up on her screen, Harry's wife Helga notices this strange behavior, pokes Harry in the ribs and Harry sees this and meekly apologizes to Betty and ducks out of the way. Betty waves her hand indicating "oh no, no problem whatsoever'.

She's now hooked of course, and the manual has told her that these first few examples are barely a tip of the iceberg of the full cooperative and crowd-cubist photography. Her cohorts look for more thumbs-up signs from her but she's now stuck there looking down at her screen as she quickly tries the Leary-mode of crowd-cubism. This is crazy nuts, she thinks to herself.

Now, back from the prom photo-fest to technical photography . . . .

Geo-Timed Kernel Projections with Connectable Mono-Directional Terminus Disks

FIG. 14A suggests a more useful and realistic model for how a photo site integrates light and produces a digital datum value, fixed within a geographic spatial framework and UTC timed for both the onset and cessation of the light integration period. The short term Geo-Timed pixels ("GT-pixels") is used at places in this disclosure, meant to encapsulate concepts from FIG. 14. (To this figure might be added the advanced features of translucent interim disks and a scattering volume function. One might call these "world emplaced" GT-pixels.)

FIGS. 14B and 14C elaborate on these concepts. FIG. 14B particularly identifies occlusion—the diamond shape between the cameras at the bottom and the pentagonal subjects near the top.

Reasonable people may ask why all the fuss. A humble answer is that classic notions of "the camera" and "taking pictures" and "making movies" are being assaulted on all fronts by technological advances such as cooperative photography, computational photography, depth photography, distributed and fused sensing, light field photography, multi-aperture photography and surely several other nouveau techno-happenings. The core geo-optical metadata associated with a pixel datum needs to get with the program. We can refer to past and essentially current definitions of "the pixel" as "Ray-Ram++ pixels."

Exacting people may ask about the addition of polarization, or more refined notions of interaction between photo sites with structured EM light fields, or more detailed placements of a datum's metadata relationship to some broader and shared metric system, such as a 3D modeled world replete with highly mobile mesh structures. The humble answer here is baby steps first please: GT-pixels can be extended given sufficient thought and maturity, e.g. with polarization. This disclosure refers to bleeding edge treatments of pixels as "Sommerfeld Pixels" in deference to the past master of Physics Arnold Sommerfeld, and paying homage to his skill at theoretically modeling a rascally empirical world.

Hopefully useful opinions might be in order after the attempted parsing of the term pixel into these three different types. The 60's and 70's pixel, "picture element," might be viewed as a grand compromise between optical scientists/engineers of the time, and their punch-card toting electrical engineering brethren. Optical purists cringed at the over-simplifications thus made while the nascent computer science community and then later the graphic arts community all inherently thought "ah, keep that focal length mumbo jumbo to yourselves please" (and "alright, it may be good for a few things but it's all projective geometry in the end anyway"). The challenge is/was that the term "pixel" had to become "overloaded" (as some would say!) right out of the gate. Is it the brightness value of an object somewhere out there, or the patch on a display screen cranking out some light? Is it really square, a delta function, a photosite sensitivity profile or just a kernel input to a wavelet compressed transformed value? The term used above of Ray-Ram++ tries to capture some of the essences of such innate debating, with the "++" itself referring directly to the ensuing 40 years of patches and extensions and "wrappings in optical science and human visual science" that have been the instruments of torture to that Gumby word.

The GT-pixel—and its inevitable physico-mathematical compromises even now and more ahead—pleads for a new accord between the new hyper-dimensional photonics community with many practioners still needing cameras, or imaging if we must, and the indescribably complex communities of engineers and developers across the digital landscape all one way or another dealing with pictures, the optical world we live in and the ancient compulsion of representation. After that mouthful, what possibly could be said about Sommerfeld pixels and why bother having such? All arguable, surely, but there is ultimately no end to the subtlety and ingenuity that can apply to isolating and articulating the relationship between EM fields and digital datum largely derived therefrom. Sommerfeld pixels wave the white flag right away and inherently argue "don't bother immediately tagging on the ++ onto GT-pixels," incubate stuff inside some home-grown Sommerfeld pixel framework, isolating that critical EM/datum juncture, then after who knows after how much time and broader utility piles up, by all means tee features up to throw over the fence into GT-pixel land in a way that programmers/developers can just say "hmmm, what's this new toy." In this disclosure, polarization specifically has been kept in the Sommerfeld camp, with a portion of the reason being to make just this last point. It's too much to add to an already large meal based on GT-pixels as defined. As polarimetric-capable cameras elbow their way onto the broader commercial (and/or meaningfully economic industrial stage), let's certainly extend GT-pixels to stokes parameters and tube-path polar-state modulators, but for at least this disclosure such Sommerfeld-leaning arcana will stay in the Sommerfeld pixel bucket.

So, then, GT-pixels may be regarded as pinched and time-twisted tubes in space. The programmer is allowed to think "whoa, pretty cool, how can I start playing with who-cares-what-they-ares." The photonics professional is equally allowed a bit of a cringe and by all means can start beefing out their truer spectro-photosite-lens convolved highly intricate natures. These are unfair stereotypes but the compromise is the key: complicated enough so that they support rather than hinder the continued explosion of photography/video, but simple enough so that a day's worth of training and exposure to developers and artists is all they need. And yes, let's admit it, GT-Pixels are really just Ray-RAM+++ pixels in disguise, just adding one more patch to Locke's sock, guilty as charged, but let's keep the spirit of "picture element" as the primary rubric!

There are various ways that GT-pixels can be manifest in computational data structures. One example is as a list of XML-tagged metadata. This metadata can include:

Technical information detailing parameters about the lens being used, and calibration information about aberrations in the particular lens path to the corresponding photosensor site;

Parameters detailing the ~hyperbolic shape of the GT-pixel tube;

The type of photosensor, and its parameters (e.g., sensitivity as a function of wavelength);

The shape of the photosite on the photosensor array (Is it square? What small geometrical intrusions exist for associated electronic circuitry?);

The 6D position of the photosite;

Timing information (including start and end of exposure interval);

Regarding the GT-pixel disk, its 6D position;

Diffraction effects that are expected around edges of occluding objects that may intrude into the GT-pixel path;

Recognition information about the surface(s) being imaged by the GT-pixel, e.g., an identification of the surface and/or the object (painted metal of a car), its texture, its spectra;

Information about transparent and translucent interfaces through which the GT-pixel may pass, e.g., glass doors and lace veils, which give rise to semi-transparent disks and scattering volumes;

Etc.

Much of this information—such as about the object/surfaces being imaged—will be common to multiple pixels. In such instance, the metadata can include a hyperlink or other pointer to a data repository where such information is expressed once, and referenced as corresponding to multiple GT-pixels It should immediately be acknowledged that a wide variety of practical applications will not need to swallow the whole GT-enchilada, where many of these metadata fields are either not needed or can be more globally defined across neighboring photosites or entire image sensors in many cases. On the other hand, as sensitive electronic analog to digital conversion practices reach single electron level performances, photosite to photosite variances become ever more important and require more explicit carriage in metadata formalism. Even with such photosite to photosite differences, great economies of data storage can be had knowing that "the same photosite" will be cranking out data values e.g. 60 times per second and such time-invariant properties don't need constant repetition.

Virtually all such metadata elements have associated "error" terms that can be estimated, and included as additional metadata elements. (Many of these error terms have interdependencies, e.g., uncertainty in the 6D position of a disk—the "best focus" point, as it may vary along the GT-pixel tube, depends on uncertainty in lens parameters, etc.) Flagging conventions are used to indicate complete ignorance of particular information if such ignorance is indeed the case.

One property of the GT-pixel is that its source point and direction is all 6D geo-timed. The "as-shot" non-cooperative popping of disks will then contain the errors inherent here, but, through both location technologies and cooperative visual-triangulation (reverse stereoscopy, akin to how Photosynth does it), camera positions to the foot and sub-foot level falls out. Also, camera-direction vectors can also become sub-degree and even approach arc-minute of one degree calibration through simple shared-scene "classic registration."

Further:

1) Disks can have an understanding if they are red, green or blue;

2) They have an understanding of focus, and hence they get smallest near the projected focal plane of the camera (its current MEMs auto-focus value), then larger closer to the camera and further from the focal plane;

3) They also are "mono-directional," in that they only flash back toward the camera they were taken with, with say a Lambertian spread (rather than being 360 pan directional flash);

4) They can understand jitter and motion-blur as well, being flashed as lines and squiggles, no problem! (adds to the art);

5) Concurrent cameras taking video and feeding disks all get piped to a shared 3D space where anyone can take any perspective on that disk-pop space;

6) "Real space" filtering can easily happen, so, for example, if I am following with my camera and I want to see exactly from its perspective, I can still "filter out" any disk popping that happens closer than 6 feet from my position, hence, this is how the "seeing through heads" can be realized. Disk-Pop Capture and Visualization, aka Crowd-Cubist Video . . . using an engine/model/schema like nothing before it The terminus disk of the GT-pixel rushes forth as a new actor, the disks of disk-pop.

Imagine yourself slowly walking through a jostling crowd at a red carpet event where Carrie Brownstein and Fred Armisen have just pulled up in their Bhagwan-repurposed Rolls, and . . . .

You get your phone out and start your own personal vid-track, walking along, good, great shots of the two getting out of the car, Fred in drag, but oops stumble . . . but no blur!, then a guy's head is between you and the pair, yet, there they are, magic! (No, cooperative photography.)

We may coin Zed-Imaging as a clean combo of now-classic "depth photography" (represented by Stereo Cameras, Lytro, ToF Cameras and even X-Zed sensors, with Zed sensors a reference to depth sensing of the type disclosed in application Ser. No. 13/842,282), with, GT-pixels. Zed-Imaging is a raw image or picture with some semblance of knowledge of depth, it can be good knowledge, it can be lousy, it can even be "none" but later "found" as we shall see, but the point is that through raw Zed-Imaging approaches, GT-Pixel terminus disks can have good-to-bad estimates of distance from the camera.

Four kinds of disks then: as-shot, shaped, coopted, and group. Lytro, ToF and X-Zed all produce the first kind, as-shot, stereo cameras a smidge of the "shaped" but primarily "as-shot;"

"Shaped" is the twin of "filtered" but it is more complicated hence needing a special word. It also formalizes such notions a SLAM, "structure through motion" and other shape-clustering of like-distance objects.

"Coopted" is where information extrinsic to a specific camera starts to come into play, most definitely including the information/pixels from other cameras. "Coopted" disks still remain specific to the "pixels" of a given specific camera, but the depth and characteristics of the disks of those pixels begins to be greatly influenced by crowd-shared information.

Finally "group disks" are abstracted entities influenced by floods of individual disk streams but able to defined and managed completely independently from the vagaries of individual feeds.

How do you view it all?

Define any virtual 3D space, then "pop" the disks (flash them for an instance) as they arrive (at a server, pumped back to your phone, whatever). One subtlety in this "pop display" is that disk characteristics such as "in focus-ness" and motion blur and the like can all influence the "weight" of the popping.

What happens? For raw current depth-cameras like, say 10 independent Lytros all viewing Carrie and Fred for example, using only "as-shot" disks, then co-popping all disks together on a screen, one will see a certainly recognizable but phantom-like and fuzzy forms, but Carrie and Fred will be "recognized" unequivocally. As one camera walks past a person's head, sure enough some disks start illuminating the back of that person's head, but no matter.

What really happens then is shaped disks, coopted disks and ultimately group disks start to take over and "clean up" the Carrie/Fred forms and "images." The art is already there though in the as-shot version of visualization.

So what about current non-Zed imagers? They take shots where their "as-shot" disks are at infinity. Whether through SLAM, "structure through motion," "structure through image forms," shading, whatnot, initial extremely poor/crude disk-distances can still be started, then as soon as a second camera joins a co-stream, classic stereoscopic algorithms cross-refine each other's disks. Coopting disks becomes the main driver with no pure Zed cameras in a pair or group. With a Zed camera in the mix, others can rally around it and coopt and group refine with that as a seed.

"Disk-pop" visualization quickly evolves into visually-smoothed and conventionally compressed experience, no question. But the raw "pop a red disk" when a red Bayer cell disk shows up, and "pop a green disk" when a green disk shows up, "blue," etc., it doesn't matter, when watching these popping disks in aggregate a color form/image will be manifest . . . another instance of persistence of vision.

Consider the case where a given camera frame can see Carrie, but Fred is blocked by a foreground head. Why should the pixels which can nicely see Carrie be tainted by their association with the pixels which cannot see Fred? Just because they come from the same camera at essentially the same instance in time? This is ARBITRARY!! It is a matter of history and convenience that GT-Pixels are bundled at first, but from there on, there is no need to reference a "camera frame" ever. GT-pixels are on their own once born, and if they can find some neighboring GT-pixels with similar "excellent qualities" and they want to cooperate (from the same sensor, or one 2 feet over with the spouse's camera), great! Cooperate away, but that one GT-pixel's disk now has a life of its own.

Breathtaking extrapolations abound from this cooperative photography baseline. Crowd-Cubist Visualization (Video) is the only short phrase capable of getting to the 1% capturing-it point.

Aside: The Pixel

After endless kneading, the pasty bread dough has circled all the way back to the deficiencies in the very definition of the pixel.

The tsunami-march of technology and the global-social beast of technology's presence has surrounded this word and doomed it to an impossible-to-detangle overloaded state.

I'm going to brashly start an overloading de-parsing exercise, though, one which the previously coined term GT-pixel was at least beginning to try to do.

Let's talk about three classes of "pixel" then:
1) Ray-Ram++ pixels (the ones most people know well)
2) GT-pixels (a compu-physical "practically complete" kind)
3) Somerfeld Pixels (an empirically-infused but ultimately purely theoretical kind) (http://en.wikipedia.org/wiki/Arnold_Sommerfeld)

Ray-Ram++ in short is saying that the 60's flat planar "ray optic" projection, manifested as a RAM array, has been patched and patched and patched over the years, most recently assaulted by "vector representations," other "light field" arcana, "wearable sensors," the Pelican camera deal, ToF and spectral pixels, mixed resolution fusion, and long ago by mixed-kernel filtering and "anisoplanatism," etc. and so forth.

The GT-pixel as a class wants to better connect singular digital datum with the physical spatio-temporal light field which gave rise to the captured value of the datum, whilst being appropriately mindful of the various errors involved in correlating the two (datum value with actual light). The datum value is the data, everything else is the physico-spatial-temporal metadata. That's all, and it wants to do so only to the point of utility for programming and applications.

The Somerfeld pixel is a hyper-class of GT-pixel that is the state of the art mathematical model of how spetro-polarimetric EM fields interact with matter, a topic near and dear to the details of M&M's inside the C-S Zed sensors and hundreds of physics and electronics labs around the world. It is richly theoretical but it fundamentally acknowledges that every "datum producer" is different than the next, and changes in time by temperature for starters, so that "empirical behavior" and its measurement MUST be a core part of its theoretical structure.

One of the ideas behind cooperative photography is to zoom in tightly and exclusively on realtime 2+ camera imaging of people (or a person), with the results being immediately accessible by not only the camera holders, but anyone they also allow to view.

GroopFoto may be used as a tradename for a social network implementation of the present technology. The app pumps pixel data to a web site in realtime, AND, actively "connects and cooperates" with other phones imaging the same people and doing the same pumping of pixels.

It becomes a social session to "make a live meshograph." It also becomes a group/individual-allowed setting to make the live and created meshograph available beyond the shooters.

A web service is part of it. It can be an essentially realtime feedback view synthesis and viewing enablement platform. As two or more pixel feeds are pumped in, a multi-viewable singular draped-mesh model is created nearly instantly, and then multiple "viewpoint feeds" are serviced from that singular draped-mesh model.

The operative meshes in this case are planar and slightly non-planar (rounded head fronts and rounded body fronts) structures trying to occupy the plane of one or more bodies in the mutual photographs. Speed of measurement of these meshes and having the meshes change in realtime become the core algorithmic challenge for the server.

BUT, artistic license at the server, disguised as hipness such as with Instagram or other go nuts filtering places, is paramount!

The hipness/art vs. science war can completely let hipness and art win out. As various "viewings" of the meshes change points of view, fuzz effects on the meshes themselves, jitter values thrown into the pixel merging onto each mesh, lighting effects and color from one camera can blend with better definition luminance channels from another, the sky is the limit on trying to have perfect visual algorithms versus what artistic license will allow. Version 1.0 server will undoubtedly be cubist in its "live" representations, but that is the point!

As noted, the server is fundamentally all about updating the meshes and draped pixels at >4 Hz on the meshes and >10 Hz on the draped pixels. This too becomes an artistic exercise as much as a technically purist one. Check out then "same view different time."

Only a slight movement of the body (FIGS. 17A and 17B), the foot is now out, but the slightly slower but very crude body mesh makes note of it, expands a bit into the "ground meshes" turf, but decides the overall scene is still fine with four meshes and just updates pixel draping and blending.

Meanwhile, the server has viewing threads all wanting to move around in viewing angle and looking for different poses, lighting, "lucky artistic effects," on and on and on.

These are all dutifully rendered on a per-thread level and piped to the given viewers.

Not to be overlooked, GT characterization of the cameras and their data feeding pixels to the web service would be the suggested mathematical form for characterizing the math of the incoming pixel pushes and the outgoing pixel streams. "Occlusion" issues where there might be gaps between meshes, draped pixels, and non-allowed viewpoints can all be handled better in this type of geo-timed framework. It's largely 3-D at its core.

The realtime experientialism of this should far outweigh and trump any "seems" and "drop-outs" and funny effects and a hundred other technically definable challenges that will be encountered. The social aspects rule, the realtime art is the power . . . .

So in such a GroopFoto app/service, all image data pumped to site is stored for immediate past-review or current viewing, using model exploration. The shooters and anyone they allow can access the current and past views, as they happen Each viewer has toggle control over how close, far, right, left, up down . . . framing the past or current views any way they wish.

Ideal situations where 4 or more cameras taking pictures of groups (e.g. team photos or pre-dance parent-photo fests); as cameras come and go from providing data to the shared site, no matter, there still is a steady flow; as some parents move in closer on their kid and his/her date, the draped detail gets ever finer and detailed.

Again, all data stored and parents can scroll through the session finding which "photos" they want to grab, then do the usual social sharing of such . . . .

The web service makes the best meshographs possible given highly sporadic channels, image quality, shakiness, etc. etc.;

Session algorithms begin after at least one camera starts providing data, and rudimentary depth processing and mesh creation (interim planes) can get started. The start of second and additional camera feeds starts classic stereographic correlation of features and detailed depth processing, including fixing of source cameras relative to objects meshes.

Virtual viewpoints on the newly created meshes can start right away. Quality in begets quality out, and at first the "live views" are what is encountered. The viewer can then "go back" and toggle around for best views of past angles, expressions, smiles, kisses!, all then snapping a photo, and then following typical social practices of posting, sharing, filtering, whatnot.

The web service also has the usual suspects of facial rec, HDR-ish lighting corrections, focal-plane filtering for various effects, on and on and on and on, graphics engines in the cloud going nuts.

Allowance must be made for data crunching—hopefully on the order of single second delays to permit HDR, affixing pixels onto the meshes, possibly even advanced albedo measurements so that as viewers frame from different directions, the lighting truly does change! Variable res meshes and variable res pixel draping onto the meshes generally in the 1 Hz or ½ hertz ranges.

In some implementation, certain processing happens locally, e.g., on the smartphone, optimizing what is sent to the shared website from each phone. Experimentation by enterprising groups quickly find limits and quirks of the mesh algorithms, eventually verging on SpinCam-esque movement around subjects and forcing the meshes from 2.5D to 3D.

The discussion next takes a third pass at the subject matter—with an emphasis on the GeoCubist Engine (GCE).

Third Pass

This description of a GroopPhoto session involves at least two active participants with cameras pumping live video feeds to 'the cloud', and a dedicated 'session instance' in the cloud servicing those two participants. Use of the word 'cloud' here is a stand-in for some location of processing capabilities typically having both classic CPUs handling much of the connectivity and 'logical UI' for a session, and more modern GPUs handling most of the pixel-crunching tasks. Participants will have smart phones as their posited GT-pixel streaming mechanisms, replete with coarse geo-location capabilities including north-vector understanding (knowing which direction a camera is facing), as well as basic horizon angle and elevation angle data as well. Iphone's 4 and above have these capabilities, as beautifully illustrated by downloading and using the program 'Theodolite' offered by Hunter Research & technology LLC of Williamsburg Va.

Such supplemented geolocation data where the 'spatial attitude' of the camera's pointing angles are also included, this disclosure will refer to as geolocation++ data.

A GroopSession begins when one participant contacts the cloud after having pushed the start button on their Groop Photo app. We will call this the GroopApp. The GroopApp also sends any and all geographic/orientation data it has, generally based on the capabilities of the smartphone as well as the preferences of the participant (where some folks may wish complete geographic privacy).

Once the GroopSession Manager (the main software routine in the cloud) is contacted and a session instantiation is requested, it proceeds with setting up a very classic 3D gaming construct founded upon a ground plane with a coordinate system, the ground plane then also having implicit altitude above that ground plane. Indeed, near 100% borrowing of 3D gaming principles is highly encouraged for this technology, no need to reinvent many of these wheels.

The participant's location then becomes the 'origin' of this newly constructed 3D 'set'. That origin then also has attached to it as much geo-information as was provided by the participant's smartphone. The participant also can send to the Manager the expected number of other participants in the upcoming session so that the cloudside CPU/GPU farms can get a general idea of the data volumes that may need to be handled in the next few minutes to tens of minutes. Rough calculations on the numbers of raw pixel data volumes based on the pixel formats of the cameras, the digital communication channel bandwidths, etc., can all be used to estimate what the pending load might be.

Figure 15:
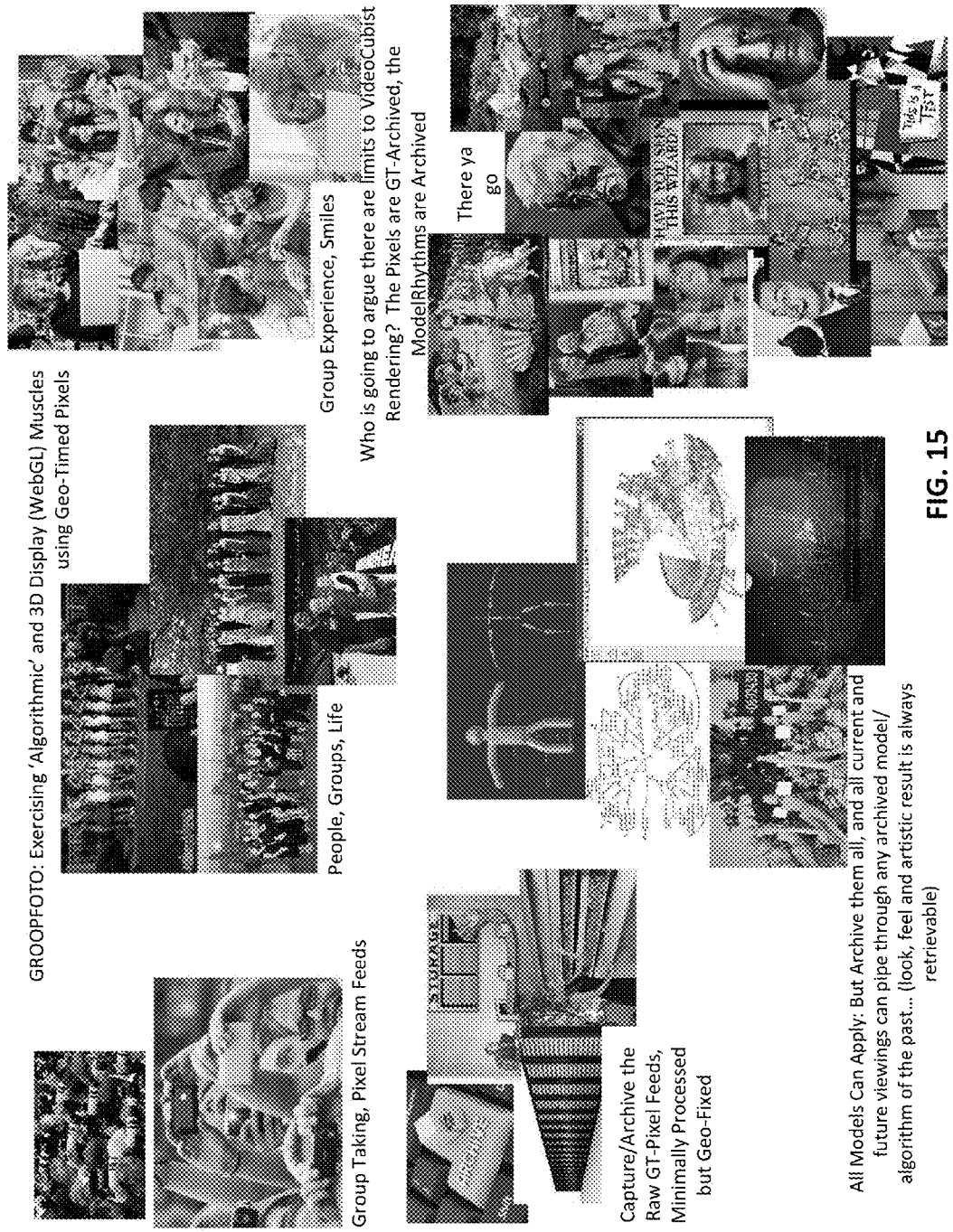
FIG. 15 represents some of the diversity of technologies—and cubist effects—associated with aspects of the present technology.

Mainly for debugging purposes, but also serving well to illustrate the functioning of the Groop Photo technology, the GroopSession manager can have a simple "single participant viewing mode" whereby as the participant's smartphone begins to pipe video footage to the manager, it can project this received video onto a virtually projected pyramidal screen out in the direction of viewing of the camera. See FIG. 15.

Again both for debugging sessions as well as for explicating this technology, as multiple participants start to attach themselves to this particular instantiated session, each can be placed into this 3-dimensional space with their own "viewing pyramid" projected and their own individual video streams displayed on those virtual screens.

The reader should take note that oftentimes there may not be enough geographic information sent by new participants in order to immediately place these new participants (and their viewing pyramids) correctly in the virtual context first established by the first participant.

Not to worry; GUI practices can easily place unknown new participant's location points off into a somewhat distant (from the first participant's point in the virtual space) and deliberately "arbitrary" place, thereby indicated visually to a debugger or human observer that certain participants are lacking in sufficient geolocation information for their pyramidal icon to be displayed properly in the GroopSpace.

But back to the place after a first participant instantiates a session, then there will be some second participant wanting in on the session, typically with permissions for such allowed by the first participant. When this second participant shows up, they too will have provided geo-location information along with their video feed. This is the point where the GeoCubist Engine must be fired up. The GCE is the sub-routine in the cloud which is the controller and execution element for turning two or more streams of video data into shared displayable output. The term "displayable" is emphasized, since there are many different options for how this output can be displayed.

The first task of the GCE is to find and then geometrically encode as many relationships as possible between the two participants. Using the debug view example above, the two participant's viewing pyramids will stay unrelated to each other barring any information on how they might become related. A rather poor but not un-useful analogy will be to where one sometimes wakes up in the morning and your two eyes have not had a chance to correlate onto the outside world and you have classic "double vision" . . . this is the situation with two participants that either have no prior geolocation information to provide OR extremely poor quality and/or precision of geolocation information.

The first primary task of the GCE is then to initiate and then maintain this hybrid operation of using both pixel information as well as auxiliary information to slowly make correlations between one participant and the other. The very obvious first thing to look for is "overlap regions" in the video of one participant and those of the other participant. With our eyes, we know they belong to the same head and generally point in the same direction, so we know that eventually stereopsis will eventually occur in such biologically-capable folks, but with two participants and two cameras, such assurance is far from the case.

The methods used in finding some pixel-commonality between two cameras having fairly different views of a common scene or objects within a scene has enjoyed a real blossoming of late. The practice of this technology encourages the use of these approaches. These often include not only tolerance for oblique angle differences, but also the actual measurement of view angle differences between one camera and another. The typical GroopSession situation will be where two participants are indeed viewing the same scene or objects in a scene from different angles. It's not quite as "given" as the two eyeballs inside one head, but it does make sense that two participants would only be firing up GroopPhoto if there is some common-subject-matter reason to do so.

Using these prior art picture-element matching approaches, the GCE thus begins the process of either establishing—in the case where zero geo-location data was provided by the participants—or refining—in the case where one or both participants provided some geolocation++ data—its own cloudside estimates of the mutual geolocation++ states of each of the participants. In this way, generally poor geolocation++ data initially (or ongoingly) being supplied by any participant can actually be checked and refined in the cloud. This use of a camera's pixel data to actually locate that camera is decades old in terms of forensic science (think Zapruder films if nothing else), and more recently it has been used to attempt actual geolocation of cameras within previously visually mapped environments. In this technology, however, for two or more participants, these general approaches will be applied toward live video streams instead.

Presuming then that the GCE is able to establish a baseline initial orientation of one participant's camera relative to the other participant's camera, the stage is now set for classic object isolation routines based on equally classic stereopsis analysis and other more modern approaches for extracting 3D surface placement based on more than one view of a scene or object (see for example the large body of work on Simultaneous Localization and Mapping—SLAM, discussed below).

The above paragraph presumes neither of the participant's cameras are "depth capable." If one or both (or more for more than two participants) of the cameras are indeed depth capable, then certainly the video feed to the cloudside GroopSession and the GCE would then include this depth data and assist in the above creation of scene surfaces relative to the positions of both observers.

Once the GTE begins even the rudiments of "possible" surfaces out in the newly constructed GroopSapce, there is no need yet to make hard decision about the actual presence or absence of surfaces, it is enough to just begin to track the possibilities of such. There is a very important point for the eventual "cubism" still to come, where precision of knowing where surfaces are, and if they are there in the first place (e.g. a thin veil), becomes a probabilistic affair, not a Boolean affair.

What happens in the GTE at this point is that as candidate surfaces do start to populate lists, rough forms in GroopSpace can be displayed (mainly to a debugging person for example) within the same graphics that were projecting the pyramids above. Call them "ghosts" if we must, but in a sense that's exactly what they are until either more exact pixel data comes in from both of the camera, more participants are added to the probabilistic session, and other factors as well (e.g. transparency factors a la the veil).

The term "'cubism" is simply a shorthand way to summarize that more than one viewpoint on "the world" is now being developed into a common "picture," where the canvas in question starts with the GCE's memory structures in the cloud. Various people can then draw realtime snapshots of these ever-changing forms and pixels, deriving their own unique views. As stated in the earlier vignette with the parents and the prom, Betty's view piped back to her own display on her smartphone can be "tuned" to be dominated by the very same pixels that she herself is contributing to the common session, but a bit of extra information based on other cameras' data can be supplementing it in the standard mode thus described, while when she pushes the "full cubist" mode, her very viewpoint of the scene can change, becoming say the bird in the tree above the whole ensemble, with shimmering and ever-changing surface planes showing up representing the moving bodies of the prom-attendees.

SEITZ/SNAVELY BIBLIOGRAPHY

Agarwal, et al, Building Rome in a Day, Communications of the ACM, Research Highlights, Vol. 54, No. 10, October 2011, pp. 105-112.

Agarwal, et al, Building Rome in a day, Proc. Int. Conf. on Computer Vision (ICCV), 2009.

Agarwal, et al, Bundle Adjustment in the Large, Proc. Eur. Conf. on Computer Vision (ECCV), 2010, pp. 29-42.

Agarwal, et al, Fast Algorithms for L_infty Problems in Multiple View Geometry, Proc. Computer Vision and Pattern Recognition (CVPR) 2008.

Agarwal, et al, Reconstructing Rome, Trans. IEEE Computer, June 2010, Vol. 43, No. 6, pp. 40-47.

Cao, et al, Learning to Match Images in Large-Scale Collections, European Conference on Computer Vision (ECCV) Workshop on Web-Scale Vision and Social Media, 2012.

Carroll et al, Rectified surface mosaics, Int. J. Computer Vision (IJCV), Vol. 85, No. 3, 2009, pp. 307-315.

Crandall, et al, Discrete-Continuous Optimization for Large-Scale Structure from Motion, Proc. Computer Vision and Pattern Recognition (CVPR) 2011.

Furukawa, et al, Manhattan-world stereo, Proc. Computer Vision and Pattern Recognition (CVPR), 2009.

Furukawa, et al, Reconstructing building interiors from images, Proc. Int. Conf. on Computer Vision (ICCV), 2009.

Furukawa, et al, Towards Internet-scale Multi-view Stereo, Proc. Computer Vision and Pattern Recognition (CVPR), 2010, pp. 1434-1441.

Garg, et al, The dimensionality of scene appearance, Proc. Int. Conf. on Computer Vision (ICCV), 2009.

Garg, et al, Where's Waldo? Matching Images of People in Crowds, Proc. Computer Vision and Pattern Recognition (CVPR) 2011.

Goesele, et al, Multi-View Stereo for Community Photo Collections. Proc. Int. Conf. on Computer Vision (ICCV) 2007.

Goldman, et al, Schematic storyboarding for video visualization and editing, ACM Trans. on Computer Graphics (SIGGRAPH Proceedings), Vol. 25, No. 3, 2006, pp. 862-871.

Goldman, et al, Spatially-varying BRDFs from photometric stereo, IEEE Trans. on Pattern Analysis and Machine Intelligence (PAMI), Vol. 32, No. 6, 2010, pp. 1060-1071.

Hauagge, et al, Image Matching using Local Symmetry Features, Proc. Computer Vision and Pattern Recognition (CVPR) 2012.

Hertzmann, et al, Example-based photometric stereo: shape reconstruction with general, varying BRDFs, IEEE Trans. on Pattern Analysis and Machine Intelligence (PAMI), Vol. 27, No. 8, 2005, pp. 1254-1264.

Kaminsky, et al, Alignment of 3D Point Clouds to Overhead Images, Proc. Computer Vision and Pattern Recognition (CVPR) 2009 Workshop on Internet Vision.

Li, et al, Generating Sharp Panoramas from Motion-blurred Videos, Proc. Computer Vision and Pattern Recognition (CVPR), 2010, pp. 2424-2431.

Li, et al, Location Recognition using Prioritized Feature Matching, European Conference on Computer Vision (ECCV) 2010.

Li, et al, Worldwide Pose Estimation using 3D Point Clouds, European Conference on Computer Vision (ECCV) 2012.

Lou, et al, MatchMiner: Efficiently Mining Spanning Structures in Large Image Collections, European Conference on Computer Vision (ECCV) 2012.

Sadovnik, et al, Image Description with a Goal: Building Efficient Discriminating Expressions for Images. Proc. Computer Vision and Pattern Recognition (CVPR) 2012.

Seitz, et al, Filter flow, Proc. Int. Conf. on Computer Vision (ICCV), 2009.

Shechtman, et al, Regenerative morphing, Proc. Computer Vision and Pattern Recognition (CVPR), 2010, pp. 615-622.

Simon, et al, Scene Summarization for Online Image Collections, Proc. Int. Conf. on Computer Vision (ICCV) 2007.

Snavely, et al, Finding paths through the world's photos, ACM Trans. on Computer Graphics (SIGGRAPH Proceedings), Vol. 27, No. 3, 2008, pp. 11-21.

Snavely, et al, Modeling the world from Internet photo collections, International Journal of Computer Vision (IJCV), Vol. 80, No. 2, 2008, pp. 189-210.

Snavely, et al, Photo tourism: exploring photo collections in 3D, ACM Trans. on Computer Graphics (SIGGRAPH Proceedings), Vol. 25, No. 3, 2006, pp. 835-846.

Snavely, et al, Scene reconstruction and visualization from community photo collections, Proc. of the IEEE, Special Issue on Internet Vision, September 2010, Vol. 98, No. 8, 2010, pp. 1370-1390.

Snavely, et al, Skeletal Sets for Efficient Structure from Motion, Proc. Computer Vision and Pattern Recognition (CVPR) 2008.

Snavely, Scene Reconstruction and Visualization from Internet Photo Collections, Doctoral thesis, University of Washington, 2008.

Zhang et al, Estimating optimal parameters for MRF stereo from a single image pair, IEEE Trans. on Pattern Analysis and Machine Intelligence (PAMI), Vol. 29, No. 2, 2007, pp. 331-342.

Concluding Remarks

Having described and illustrated the principles of the inventive work with reference to illustrative examples, it will be recognized that the technology is not so limited.

For example, while the technology has been described by reference to plural cameras providing video imagery of a scene, in other embodiments still imagery can be used. Alternatively, some cameras can provide video imagery while others provide still imagery. In still other arrangements, one or more of the devices may provide swept imagery data, as detailed in pending application Ser. No. 13/842,282. (In such arrangements, the sensor may be physically moved during each exposure interval, e.g., to reduce blur effects.) One or more of the contributing cameras can be carried (or worn) by a user, and one or more other cameras can be stationary (e.g., fixed in a sports arena).

In still further arrangements, one or more of the cameras may not provide imagery per se, but may rather gather depth map information (e.g., using Kinect-like technology, which may involve projecting patterned light onto the scene). In still other arrangements, one or more of the component systems may illuminate the scene by flashes or otherwise during the capture period. Color fidelity can be improved, and other benefits can be realized, if one or more of the contributing systems uses the technology detailed in published application 20130308045 and pending application Ser. No. 14/201,852, filed Mar. 8, 2014.

Likewise, the reference to the output image products being still imagery or video may not be accurate in the historical sense of those terms. More generally, the output products may be regarded as "meshographs"—representing general viewpoints onto shared scenes, where depths of objects are represented by spatially staggered meshes, and pixel data derived from multiple contributed sources plaster those meshes.

In some embodiments, the 3D model data (rather than imagery or video per se) may be provided to the consumer's device, which can employ its own software to render the model data in any user-desired fashion.

User navigation to a desired viewpoint in the model can employ any of the well-known 3D UIs, such as the UI employed by Google's Street View product by which users control viewpoints of street-side imagery.

Figure 19:
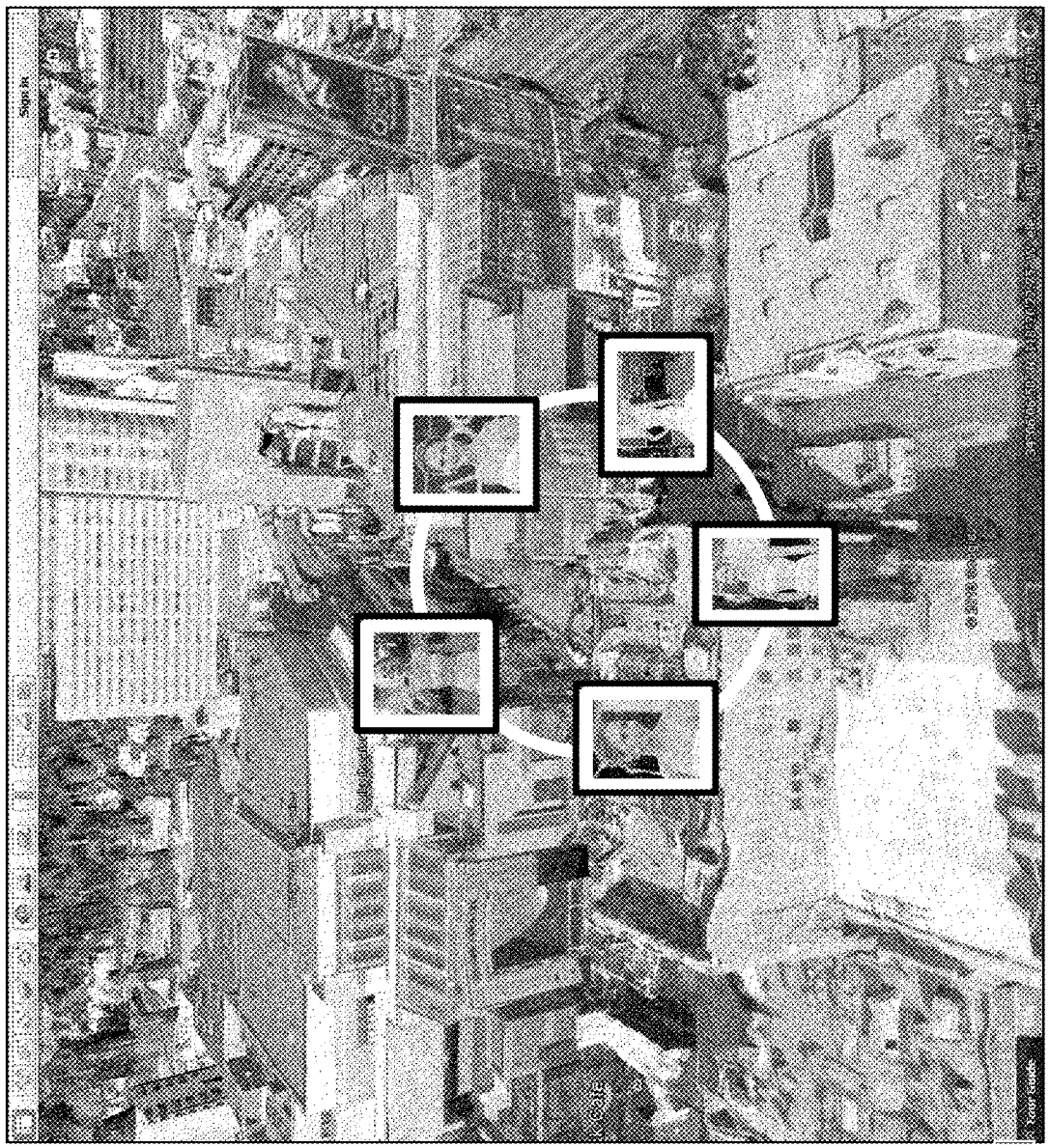
FIG. 19 depicts features of a user interface, which shows feeds of image data to the cloud-based system from common geolocations.
Figure 19:
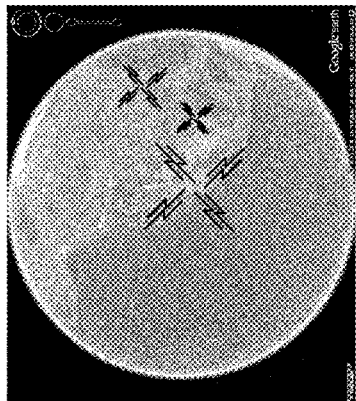
Figure 19:
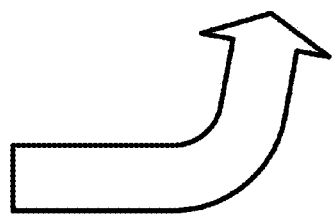

A UI can additionally be provided by which users and others can monitor real-time ingestion of data by the system, e.g., as an overlay in the Google Earth product. Flashes of light can appear at locations where two or more streams of data are being fed to the cloud-based system within a common geolocation or from a common event. The UI can permit zooming-in on the location to see an array of thumbnails depicting representative still or video clips of the different input data feeds. One such arrangement is shown in FIG. 19.

The same, or a different, UI can similarly provide real-time thumbnail representations of rendered image products produced by the system and delivered to requesting users.

The present technology may be operated by Google, Facebook, or another company as a commercial enterprise, either simply in exchange for access to the uploaded data for data mining purposes, or supported by ad or other revenue.

In one such offering, the service provides users free access to model data to which they contributed input data, while users who consume—without contributing—may be charged a fee, or may be granted access only to lower resolution image products (or to image products rendered with ad-pairing, as in YouTube). For some users, such a service may effectively serve as an archive for their lifelog data feeds. For example, all video captured by such users (e.g., using headworn camera arrangements) is streamed to the cloud service, where it is stored. If it is matched with other feeds depicting common scenes, then the service generates corresponding model information. If such a model is generated, then the input video (being content-impoverished by comparison) may be discarded. For unmatched data, the video is retained.

While reference has been made to a cloud-based system that orchestrates the data collection and rendering, in other embodiments this role may be distributed among the data collecting devices themselves, e.g., in a peer-to-peer network. Some peers in the network may only provide—not consume—pixels. For other peers, the situation may be reversed.

Applicant's other work concerning smartphone-based imaging systems and related technologies is detailed, e.g., in patent publications 20130311329, 20130314541, 20110212717, 20110161076, 20120284012, 20120218444, 20120046071, and in pending application Ser. No. 13/651,182, filed Oct. 12, 2012, Ser. No. 13/789,126, filed Mar. 7, 2013, Ser. No. 13/892,079, filed May 10, 2013, Ser. No. 13/946,968, filed Jul. 19, 2013, Ser. No. 14/152,925, filed Jan. 10, 2014, Ser. No. 14/201,852, filed Mar. 8, 2014, and Ser. No. 61/838,165, filed Jun. 21, 2013.

While reference has been made to smartphones, it will be recognized that this technology finds utility with all manner of devices—both portable and fixed. Tablets, laptop computers, digital cameras, wrist- and head-mounted systems and other wearable devices, servers, etc., can all make use of the principles detailed herein. (The term "smartphone" should be construed herein to encompass all such devices, even those that are not telephones.)

Sample smartphones include the Apple iPhone 5; smartphones following Google's Android specification (e.g., the Galaxy S4 phone, manufactured by Samsung, and the Google Moto X phone, made by Motorola), and Windows 8 mobile phones (e.g., the Nokia Lumia 1020, which features a 41 megapixel camera).

Among the Android options, the Nokia N900 is usable with the open source FCam software for programmatic computer camera control. This is advantageous because the FCam technology can be called by the remote service to request one or more cameras to take certain actions that might be useful in creating the model. For example, the remote service may note that the image model would benefit if one of the image feeds were over-exposed (or under-exposed), to permit better resolution of details in shadows (or highlights), or to permit synthesis of HDR imagery. Alternatively, the service may determine that certain shape information could be more accurately resolved if the scene were momentarily illuminated obliquely—as by a flash from a camera of person standing off to the side, while an image is being captured by a camera of another person in front of the group. The service can make such requests to camera control software running on one or more of the cameras viewing a scene, to which the camera(s) can respond by acting as requested, e.g., capturing certain data and providing it to the service for inclusion in the model. Thus, the system can employ feedback from the cloud-based processor to the data collecting devices, to achieve enhanced system operation.

Details of the Apple iPhone, including its touch interface, are provided in Apple's published patent application 20080174570.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, a T-1 internet connection, etc.).

The processes and system components detailed in this specification can be implemented as instructions for computing devices, including general purpose processor instructions for a variety of programmable processors, such as microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. As noted, cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks (e.g., identifying the mesh planes) can be performed exclusively by one device or the other, or execution can be distributed between the devices. Thus, it should be understood that description of an operation as being performed by a particular device (e.g., a smartphone) is not limiting but exemplary; performance of the operation by another device (e.g., a remote server), or shared between devices, is also expressly contemplated.

(In like fashion, description of data being stored on a particular device is also exemplary; data can be stored anywhere: local device, remote device, in the cloud, distributed, etc.)

As noted, the present technology can be used in connection with wearable computing systems, including headworn devices. Such devices typically include display technology by which computer information can be viewed by the user—either overlaid on the scene in front of the user (sometimes termed augmented reality), or blocking that scene (sometimes termed virtual reality), or simply in the user's peripheral vision. Exemplary technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

The creation of 3D models from imagery, and the use of such models, are presumed to be familiar to the artisan. Those practiced in the art of stereoscopic 3D reconstruction of objects from just two viewpoints will recognize that this technology goes back decades. Many off-the-shelf packages are available to perform such tasks. These include Autodesk's 123D Catch, which takes multiple photo views of an object as input, and produces a corresponding 3D model as output. Hypr3D is another such package. Many other such tools are identified at the Wikipedia article for Photogrammetry.

The Wikipedia article "Structure from Motion" (Appendix D) provides additional information on such technology, and includes links to several such software packages. These include the Structure from Motion toolbox by Vincent Rabaud, Matlab Functions for Multiple View Geometry by Andrew Zissermann, the Structure and Motion Toolkit by Phil Torr, and the Voodoo Camera Tracker (a tool for integrating real and virtual scenes, developed at the University of Hannover).

Such methods are also known from work in simultaneous location and mapping, or SLAM. A treatise on SLAM is provided in Durrant-Whyte, et al, Simultaneous Localisation and Mapping (SLAM): Part I The Essential Algorithms, and Part II State of the Art, IEEE Robotics and Automation, Vol. 13, No. 2 (pp. 99-110) and No. 3 (pp. 108-117), 2006. One implementation of SLAM adapted to operate even on mobile device CPUs/GPSs is available from 13th Lab, AB.

OpenSource implementations of SLAM are widely available; many are collected at OpenSLAM<dot>org. Others include the CAS Robot Navigation Toolbox (at www<dot>cas<dot>kth<dot>se/toolbox/index<dot>html), Matlab simulators for EKF-SLAM, UKF-SLAM, and FastSLAM 1.0 and 2.0 at www<dot>acfr<dot>usyd<dot>edu<dot>au/homepages/academic/tbailey/software/index<dot>html; Scene, at www<dot>doc<dot>ic<dot>ac<dot>uk/~ajd/Scene/index<dot>html; and a C language grid-based version of FastSLAM at www<dot>informatik<dot>uni-freiburg<dot>de/~haehnel/old/download<dot>html. (The <dot> convention is used so that this text is not rendered in hyperlink form by browsers, etc.) SLAM is well suited for use with uncalibrated environments, as it defines its own frame of reference.

In an ideal contemporary implementation, the cloud processors that perform the modeling tasks employ collections of NVidia multi-core graphics processors—such as Quadro K5100Ms or Tesla Fermi M2090s.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

Elements and teachings within the different embodiments disclosed in the present specification are also meant to be exchanged and combined.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. (The reader is presumed to be familiar with such prior work.) Those references disclose technologies and teachings that the inventors intend be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.)

In view of the wide variety of embodiments to which the principles and features discussed above can be applied, it should be apparent that the detailed embodiments are illustrative only, and should not be taken as limiting the scope of the invention. Rather, we claim as our invention all such modifications as may come within the scope and spirit of the following claims and equivalents thereof.

The invention claimed is:

1. A method comprising the acts:

from a first device conveyed by a first user having a first viewpoint of a scene, receiving first data, the first data including (a) a first stream of captured time-changing imagery depicting said scene over a time interval, (b) first scene depth information identifying distances from the first device to plural points in the scene, and (c) time-based synchronization information, a first view of the scene from said first viewpoint being momentarily interrupted by a first moving occlusion between the first device and the scene; and providing said first user of the first device a view of the scene, without said interrupting first moving occlusion, from said first viewpoint, said providing employing a hardware processor to synthesize imagery to replace occluded imagery, using other data from one or more other devices conveyed by one or more other users having one or more other viewpoints of said scene different than said first viewpoint, said other data including, for each of said one or more other devices: (a) another stream of captured time-changing imagery depicting said scene over a time interval, (b) other scene depth information identifying distances from the other device to plural points in the scene, and (c) time-based synchronization information, said other data being used by said hardware processor to synthesize said imagery;

wherein a transient scene occlusion in the stream of imagery captured by the first user's device is mitigated based on data from one or more streams of imagery captured by one or more other users' devices.

2. The method of claim 1 in which a view of said scene, from a second viewpoint, by a second user's second device, is momentarily interrupted by a second moving occlusion between the second device and the scene, and in which the method further includes:

providing said second user of the second device a view of said scene, without said interrupting second moving occlusion, from said second viewpoint, said providing using imagery captured by the first user device;

wherein the first user device both benefits from image data captured by others, and supplies image data to others, to mitigate transient scene occlusion.

3. The method of claim 1 in which the scene comprises a sporting event, including multiple players.

4. The method of claim 1 in which the first device includes a headworn camera.

5. The method of claim 1 in which said one or more streams also include orientation information discerned from at least a magnetometer, gyroscope, or accelerometer in said one or more other devices.

6. The method of claim 1 in which said first stream, and said one or more other streams, of imagery, each comprises a sequence of images captured at periodic intervals.

7. A system including an interface, a processor and a memory, the interface being adapted to exchange data with first, second and third camera-equipped user devices, the memory including programming instructions that configure the system to perform acts including:

receiving first data, the first data including first scene image data captured by the first device camera and depicting a view of a subject from a first viewpoint with a transient interrupting occlusion, the first data also including first scene depth map information indicating distance from the first device camera to each of plural points in the first scene image data;

receiving second data, the second data including second scene image data captured by the second device camera and depicting a view of the subject from a second viewpoint without the interrupting occlusion, the second data also including second scene depth map information indicating distance from the second device camera to each of plural points in the second scene image data;

receiving third data, the third data including third scene image data captured by the third device camera and depicting a view of the subject from a third viewpoint without the interrupting occlusion, the third data also including third scene depth map information indicating distance from the third device camera to each of plural points in the third scene image data;

generating projected first disk data corresponding to positions and energies of plural first disks projected onto the first scene imaged by the first device camera, said generating being based on (a) a point spread function for the first device camera, (b) said first scene depth map information, and (c) said first viewpoint;

generating projected second disk data corresponding to positions and energies of plural second disks projected onto the second scene imaged by the second device camera, said generating being based on (a) a point spread function for the second device camera, (b) said second scene depth map information, and (c) said second viewpoint;

generating projected third disk data corresponding to positions and energies of plural third disks projected onto the third scene imaged by the third device camera, said generating being based on (a) a point spread function for the third device camera, (b) said third scene depth map information, and (c) said third viewpoint;

synthesizing an image of the subject without said interrupting occlusion using said projected first, second and third disk data;

wherein a transient scene occlusion in the imagery captured by the first device is mitigated based on data from streams of imagery captured by the second and third devices.

8. The method of claim 1 in which the hardware employs the scene depth information from the first and other devices to identify scene points depicted in the first stream of captured time-changing imagery that are occluded from the first device viewpoint.

9. The method of claim 1 in which the scene depicts one or more subjects on a horizontal plane, and the method includes:
defining a 3D cuboid volume, one side of which comprises said horizontal plane; and
synthesizing a model of the one or more subjects within said cuboid volume, said model omitting subjects outside said cuboid volume;
wherein the method spatially filters image data captured by the first and other devices depicting subjects outside said volume.

10. The method of claim 1 that further includes:
generating projected first disk data corresponding to positions and energies of plural first disks projected onto the scene imaged by the first device, said first disk data being dependent on (a) a point spread function for a camera portion of said first device, (b) said first scene depth information, and (c) said first viewpoint;

for each of the one or more other devices, generating projected other disk data corresponding to positions and energies of plural other disks projected into the scene imaged by the other device, said generating being based on (a) a point spread function for a camera portion of said other device, (b) said other scene depth information, and (c) said other viewpoint; and synthesizing a picture cell of output information by summing energy contributions from one or more of said projected first disks with energy contributions from one or more of said projected other disks.

11. A method comprising the acts:
receiving first data, the first data including first scene image data captured by a first camera depicting a view of a subject from a first viewpoint with an interrupting occlusion, the first data also including first scene depth map information indicating distance from the first camera to each of plural points in the first scene image data;

receiving second data, the second data including second scene image data captured by a second camera depicting a view of the subject from a second viewpoint without the interrupting occlusion, the second data also including second scene depth map information indicating distance from the second camera to each of plural points in the second scene image data;

generating projected first disk data corresponding to positions and energies of plural first disks projected onto the first scene imaged by the first camera, said generating being based on (a) a point spread function for the first camera, (b) said first scene depth map information, and (c) said first viewpoint;

generating projected second disk data corresponding to positions and energies of plural second disks projected onto the second scene imaged by the second camera, said generating being based on (a) a point spread function for the second camera, (b) said second scene depth map information, and (c) said second viewpoint; and based on both said projected first and second disk data, synthesizing an image of the subject without said interrupting occlusion.

* * * * *